United States Patent
Kito et al.

(10) Patent No.: US 7,556,848 B2
(45) Date of Patent: Jul. 7, 2009

(54) SYNTHETIC RESIN FUSION BODY

(75) Inventors: Kazuyori Kito, Odawara (JP);
Tomonori Ikuma, Wako (JP)

(73) Assignees: Honda Motor Co., Ltd., Tokyo (JP);
Mikuni Corporation, Tokyo (JP)

( * ) Notice: Subject to any disclaimer, the term of this patent is extended or adjusted under 35 U.S.C. 154(b) by 471 days.

(21) Appl. No.: 10/560,233

(22) PCT Filed: Jun. 8, 2004

(86) PCT No.: PCT/JP2004/007967

§ 371 (c)(1),
(2), (4) Date: Apr. 19, 2006

(87) PCT Pub. No.: WO2004/111426

PCT Pub. Date: Dec. 23, 2004

(65) Prior Publication Data
US 2006/0240206 A1     Oct. 26, 2006

(30) Foreign Application Priority Data

Jun. 13, 2003 (JP) ............... 2003-168983
Jun. 7, 2004 (JP) ............... 2004-168238

(51) Int. Cl.
*B32B 1/08* (2006.01)
*B32B 3/00* (2006.01)
(52) U.S. Cl. ............ 428/36.9; 428/60; 123/184.42; 123/184.47; 123/184.61; 138/171
(58) Field of Classification Search ............ 428/36.9, 428/60; 123/184.42, 184.47, 184.61; 138/171
See application file for complete search history.

(56) References Cited

U.S. PATENT DOCUMENTS 6,988,478 B2 *  1/2006  Tanikawa et al. ....... 123/184.42

FOREIGN PATENT DOCUMENTS

| JP | 6-73368 | 10/1994 |
| JP | 9-189270 | 7/1997 |
| JP | 11-82200 | 3/1999 |
| JP | 2001-342917 | 12/2001 |
| JP | 2003-239816 | 8/2003 |

* cited by examiner

*Primary Examiner*—William P Watkins, III
(74) *Attorney, Agent, or Firm*—Wenderoth, Lind & Ponack, L.L.P.

(57) ABSTRACT

The present invention is to provide a synthetic weld body which sectional shape of a passage to a bore can be an ideal shape by welding two synthetic members.

The edge at the passage side of the rising boundary line 78a-1, 78a-2, 78b-1, 78b-2, 78c-1, 78c-2, 78d-1, 78d-2 which is the boundary between the top end connecting face and the mount connecting face of the middle member 70 is disposed at or in the vicinity of a contact point of the tangent line of the ridge line 84 of the mount connecting face at the passage side with the inner edge of the top end connecting face 74a, 74b, 74c, 74d at the bore 50a, 50b, 50c, 50d side. The rising boundary line 78a-1, 78a-2, 78b-1, 78b-2, 78c-1, 78c-2, 78d-1, 78d-2 including the edge at the passage side is parallel to the standard direction for vibration.

4 Claims, 24 Drawing Sheets

FIG.6
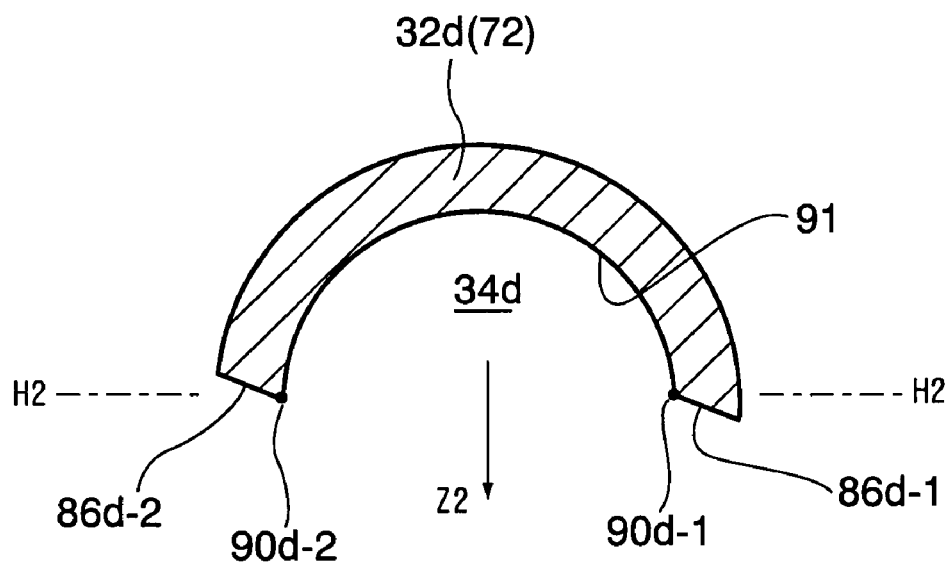
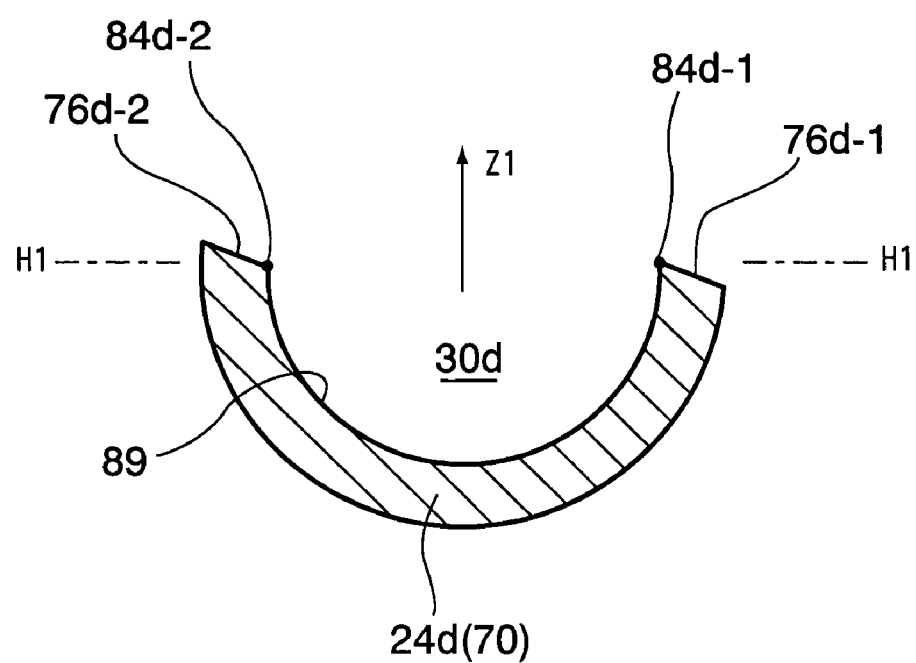

FIG.14
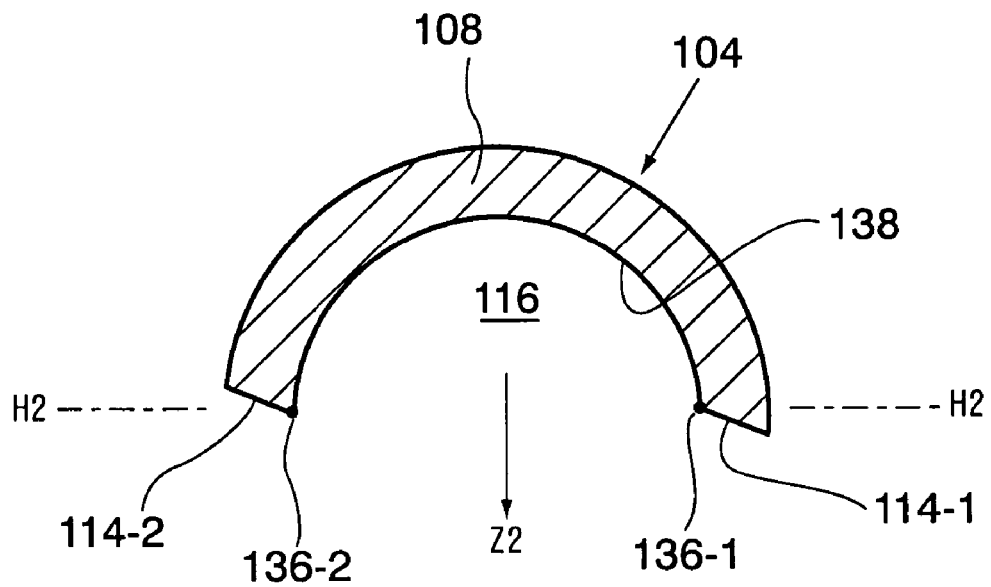
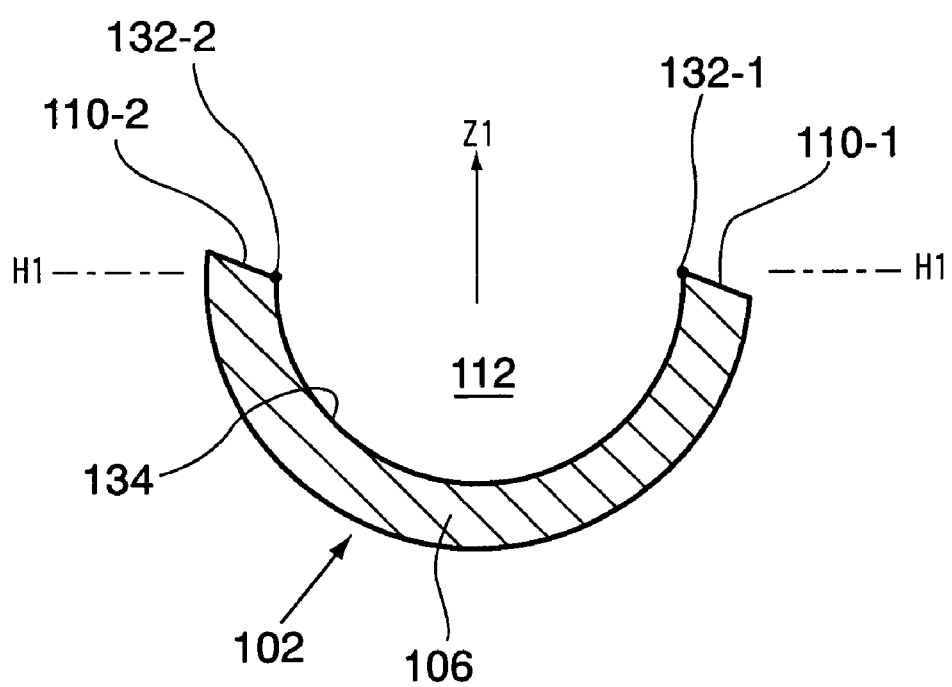

FIG.21
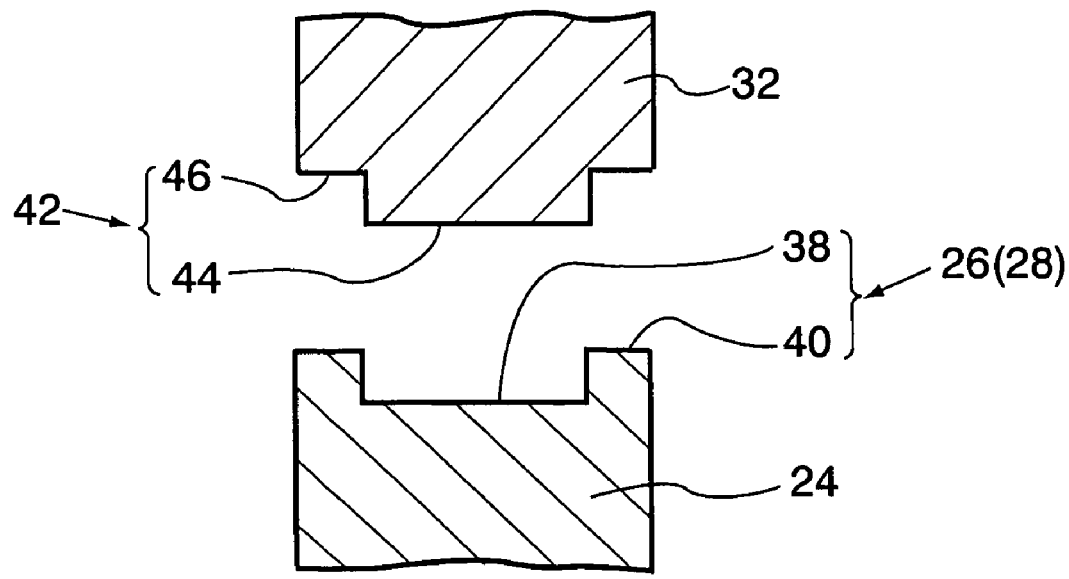
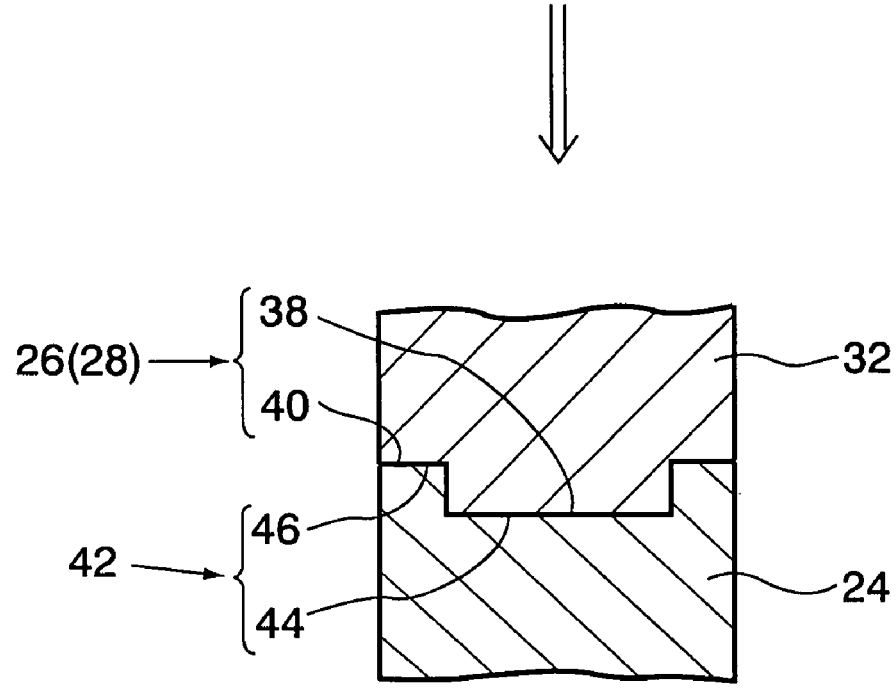

FIG.23
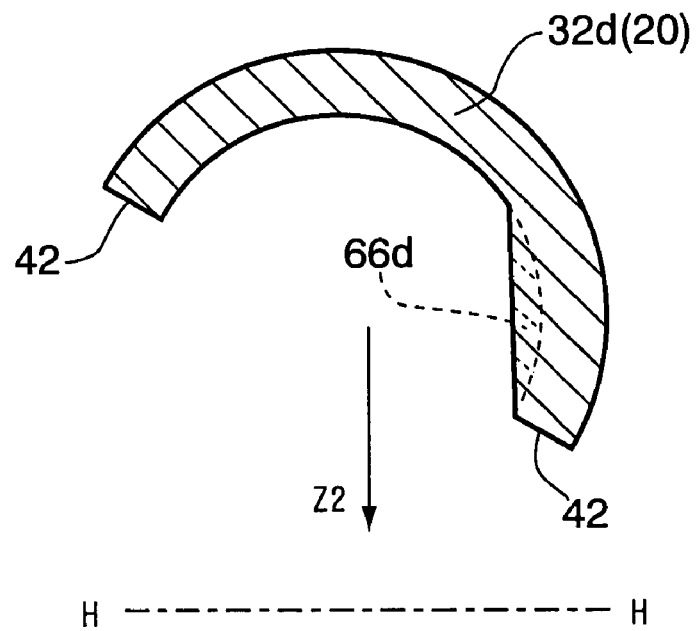
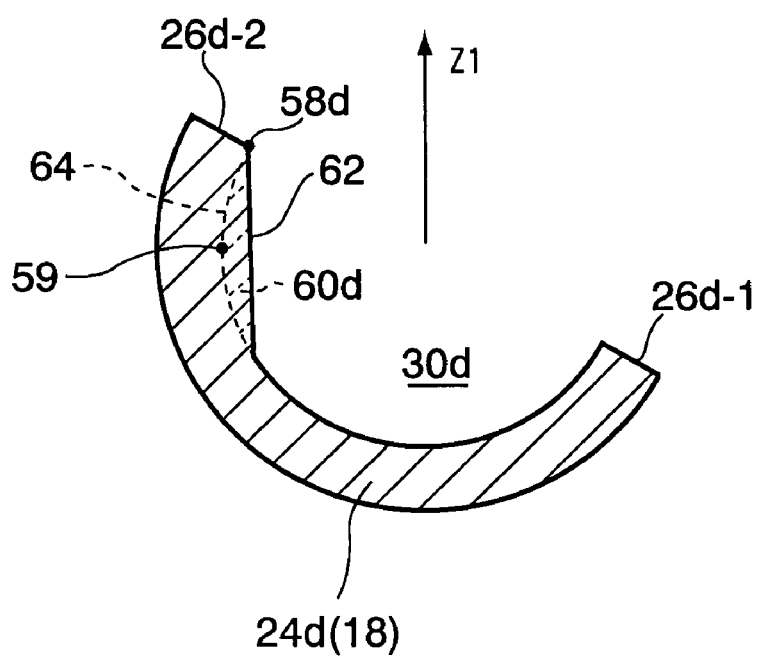

US 7,556,848 B2

SYNTHETIC RESIN FUSION BODY

TECHNICAL FIELD

The present invention relates to a synthetic resin weld body which forms a passage connecting to a bore by welding two members.

BACKGROUND ART

When a multi-cylinder engine is used, an intake manifold with the same number of intake passages as the cylinders is disposed between the engine and the throttle body. As disclosed in Japanese Patent Laid-open 2001-342917 (page 3 and FIG. 4 through 5), intake manifolds made of synthetic resin are utilized from the points of easiness in forming shapes, lightening, and cost reduction etc., since various shapes of intake passages are formed in an intake manifold.

An intake manifold made of synthetic resin is explained in the following. As shown in FIG. 16, an intake manifold 10 comprises three members; a lower member 14 connecting to a throttle body 12, a middle member 18 (see FIG. 17) as a first member connecting one end to the lower member 14 and the other end to an engine 16, and an upper member 20 (see FIG. 18) as a second member connecting to the upper side of the middle member 18. As shown in FIG. 19, four intake passages 22a, 22b, 22c, 22d, for example, are formed in the intake manifold 10.

As shown in FIG. 17 and FIG. 20, the middle member 18 has four branched lower arms 24a, 24b, 24c, 24d which are shaped like, for example, a pipe cut in half in the axis direction and bended in a desired form. As shown in FIG. 20, a pair of mount connecting faces 26a-1, 26a-2 is formed at both sides of the branched lower arm 24a in the vicinity of the engine 16. Then, a lower passage space 30a is formed as a hollow between the pair of the mount connecting faces 26a-1, 26a-2. This lower passage space 30a forms approximately the lower half of the space of the intake passage 22a. In the same manner, a pair of mount connecting faces 26b-1, 26b-2 is formed at both sides of the branched lower arm 24b, and a lower passage space 30b is formed as a hollow between the pair of the mount connecting faces 26b-1, 26b-2. In the same manner, a pair of mount connecting faces 26c-1, 26c-2 is formed at both sides of the branched lower arm 24c, and a lower passage space 30c is formed as a hollow between the pair of the mount connecting faces 26c-1, 26c-2. In the same manner, a pair of mount connecting faces 26d-1, 26d-2 are formed at both sides of the branched lower arm 24d, and a lower passage space 30d is formed as a hollow between the pair of the mount connecting faces 26d-1, 26d-2. The lower intake passage spaces 30a, 30b, 30c, 30d respectively form a part (which is the first intake passage) of the intake passages 22a, 22b, 22c, 22d. Further, as shown in FIG. 20, the mount connecting face 26a-2 and the mount connecting face 26b-1 become a mount connecting face 28ab at some midpoint. The mount connecting face 26b-2 and the mount connecting face 26c-1 become a mount connecting face 28bc at some midpoint. The mount connecting face 26c-2 and the mount connecting face 26d-1 become a mount connecting face 28cd at some midpoint.

As shown in FIG. 18, the upper member 20 has four branched upper arms 32a, 32b, 32c, 32d which are shaped like, for example, a pipe cut in half in the axis direction and bended in a desired form. The upper passage spaces 34a, 34b, 34c, 34d are respectively formed at the branched upper arms 32a, 32b, 32c, 32d as hollows. The upper passage spaces 34a, 34b, 34c, 34d respectively form the second intake passages which is approximately the upper half of the intake passages 22a, 22b, 22c, 22d.

After respectively connecting the branched lower arms 24a, 24b, 24c, 24d of the middle member 18 shown in FIG. 17 and the branched upper arms 32a, 32b, 32c, 32d of the upper member 20 shown in FIG. 18, vibration welding is performed at the connecting positions. Then, each lower passage space 30a, 30b, 30c, 30d and each upper passage space 34a, 34b, 34c, 34d are connected, and four intake passages 22a, 22b, 22c, 22d shown in FIG. 19 are formed.

The connecting state of the branched lower arm 24 and the branched upper arm 32 is shown in FIG. 21. The connecting face 26 (28) of the branched lower arm 24 with the branched upper arm 32 has a center connecting face 38 which is a recess connecting face, and a side connecting face 40 which is a convex connecting face located at both sides of the center connecting face 38. The connecting face 26 (28) corresponds to the mount connecting faces 26a-1, 26a-2, 26b-1, 26b-2, 26c-1, 26c-2, 26d-1, 26d-2, 28ab, 28bc, 28cd shown in FIG. 20. On the other hand, the connecting face 42 of the branched upper arm 32 to the branched lower arm 24 has a center connecting face 44 which is a convex connecting face, and a side connecting face 46 which is a recess connecting face located at both sides of the center connecting face 44. The center connecting face 38 of the branched lower arm 24 and the center connecting face 44 of the branched upper arm 32 are arranged to be in the same matching plane when connected. Further, the side connecting face 40 of the branched lower arm 24 and the side connecting face 46 of the branched upper arm 32 are arranged to be in the same matching plane when connected.

The branched lower arm 24 and the branched upper arm 32 are fixed by vibration welding by contacting the center connecting face 38 of the branched lower arm 24 with the center connecting face 44 of the branched upper arm 32, and contacting the side connecting face 40 of the branched lower arm 24 with the side connecting face 46 of the branched upper arm 32. In this manner, the connecting face 26 (28) of the branched lower arm 24 and the connecting face 42 of the branched upper arm 32 are welded and fixed. Then, the intake passages 22a, 22b, 22c, 22d are formed. Here, the recess center connecting face 38 and the convex side connecting face 40 can be formed not at the branched lower arm 24 but at the branched upper arm 32, and the convex center connecting face 44 and the recess side connecting face 46 can also be formed not at the branched upper arm 32 but at the branched lower arm 24. In the following explanation, the connecting position of the branched lower arm 24 and the branched upper arm 32 is indicated by one plane for convenience.

As shown in FIG. 20, an attachment base 48 is integrally formed at the engine 16 side of the middle member 18. Four cylinder-shaped bores 50a, 50b, 50c, 50d are formed at the attachment base 48. The four bores 50a, 50b, 50c, 50d connect one side to the engine 16 and the other side to the lower passage space 30a, 30b, 30c, 30d. Namely, the bores 50a, 50b, 50c, 50d respectively form a part (which is the first intake passage) of the intake passages 22a, 22b, 22c, 22d. Here, the axis centers of the cylindrical bores 50a, 50b, 50c, 50d are arranged to be in parallel and numbered as 52a, 52b, 52c, 52d. Further, all the axis centers 52a, 52b, 52c, 52d are arranged to intersect with a line in the standard direction for vibration (line A-A in FIG. 20). The standard direction for vibration means the direction in which welding vibration is applied. For example in FIG. 16, it is the direction perpendicular from the front side of the paper towards the back side and vice versa. Line A-A shows one line in the standard direction for vibration.

Respective traveling direction lines of the lower passage spaces 30a, 30b, 30c, 30d towards the bores 50a, 50b, 50c, 50d are shown by Ra, Rb, Rc, Rd in FIG. 20. In the intake manifold 10, the directions Ra, Rb, Rc, Rd of the intake passages 22a, 22b, 22c, 22d (the lower passage space 30a, 30b, 30c, 30d) towards the respective bore 50a, 50b, 50c, 50d are not aligned because of layout restrictions. Therefore, only one of the four intake passages 22a, 22b, 22c, 22d, namely, the intake passage 22a, can be arranged in the ideal direction. Then, the traveling direction line Ra of one lower passage space 30a out of the lower passage spaces 30a, 30b, 30c, 30d which are formed in the middle member 18 is arranged to be perpendicular to line A-A in FIG. 20. That is, an ideal arrangement. The rest of the traveling direction lines Rb, Rc, Rd of the lower passage spaces 30b, 30c, 30d are arranged so that as the distance from the traveling direction line Ra increases, the respective intersecting angle with line A-A gradually becomes smaller than 90 degrees.

As shown in FIG. 20, the approximately half-ring-shaped top end connecting faces 54a, 54b, 54c, 54d which position on the same plane are formed around each bore 50a, 50b, 50c, 50d. The top end connecting face 54a is connected at both ends to the mount connecting faces 26a-1, 26a-2. In the same manner, the top end connecting face 54b is connected to the mount connecting faces 26b-1, 26b-2. The top end connecting face 54c is connected to the mount connecting faces 26c-1, 26c-2. The top end connecting face 54d is connected to the mount connecting faces 26d-1, 26d-2.

Rising boundary lines from the top end connecting face 54a to the mount connecting faces 26a-1, 26a-2 are indicated as 56a-1, 56a-2. In the same manner, rising boundary lines from the top end connecting face 54b to the mount connecting faces 26b-1, 26b-2 are indicated as 56b-1, 56b-2. Rising boundary lines from the top end connecting face 54c to the mount connecting faces 26c-1, 26c-2 are indicated by 56c-1, 56c-2. Rising boundary lines from the top end connecting face 54d to the mount connecting faces 26d-1, 26d-2 are indicated as 56d-1, 56d-2.

As mentioned above, all the connecting portions of each branched lower arm 24a, 24b, 24c, 24d and each branched upper arm 32a, 32b, 32c, 32d are arranged to be parallel to line A-A in FIG. 20, namely to the standard direction for vibration. Therefore, conventionally, all the rising boundary lines 56a-1, 56a-2, 56b-1, 56b-2, 56c-1, 56c-2, 56d-1, 56d-2 are arranged to be on the same line as line A-A in FIG. 20.

Since the mount connecting face 26a-1, 26a-2 which is connected to the top end connecting face 54a is disposed to be perpendicular to line A-A in FIG. 20, the ridge line 58a at the inside of the mount connecting face 26a-1, 26a-2 towards the lower passage space 30a does not project to the lower passage space 30a side. However, the ridge line 58b at the inside of the mount connecting face 26b-2 projects to the lower passage space 30b side. In the same manner, the ridge line 58c at the inside of the mount connecting face 26c-2 projects to the lower passage space 30c side. The ridge line 58d at the inside of the mount connecting face 26d-2 projects to the lower passage space 30d side.

The connecting face 26 of the branched lower arm 24d of the middle member 18 and the connecting face 42 of the branched upper arm 32d of the upper member 20 are connected as shown in FIG. 21. FIG. 22 is a sectional view at line X-X in FIG. 20 in the state that the connecting faces 24, 42 are vibration-welded. Line X-X is arranged to be inclined to line A-A. In FIG. 23, the branched lower arm 24d of the middle member 18 and the branched upper arm 32d of the upper member 20 in FIG. 22 are shown in a separated manner. In FIG. 23, in the case that the branched lower arm 24d of the middle member 18 is formed by a die, the die is pulled out in the direction of arrow Z1. The ridge line 58d at the inside of the upper face of the mount connecting face 26d-2 projects to the lower passage space 30d side and beyond a dent position 59 which is the most dented position of the inner wall of the lower passage space 30d. Therefore, the lower region of the ridge line 58d cannot be scooped out to the dent position 59. Thus, a lower thick portion 60d is formed below the ridge line 58d. The lower thick portion 60d, which is a sectional portion slashed by dotted lines in the figure, is the area surrounded by a vertical line 62 drawn from the ridge line 58d and an arc 64 shown by a dotted line. It is ideal that the arc 64 becomes the wall face of the lower passage space 30d. In the same manner, in the case that the branched upper arm 32d of the upper member 20 is formed by a die, the die is pulled out in the direction of arrow Z2. In this case also, because of the same reason as the branched lower arm 24d, an upper thick portion 66d, which is the sectional portion slashed by dotted lines in the figure, is formed at the branched upper arm 32d.

In the state shown in FIG. 22, the lower thick portion 60d formed at the branched lower arm 24d and the upper thick portion 66d formed at the branched upper arm 32d project towards the inside of the intake passage 22d. As a result, because of the lower thick portion 60d and the upper thick portion 66d, the sectional shape of the intake passage 22d cannot become circular which is the ideal shape. Here, since respective angles of the traveling direction lines Ra, Rb, Rc, Rd of the lower passage spaces 30a, 30b, 30c, 30d of the branched lower arms 24a, 24b, 24c, 24d against line A-A each differ, the sectional shapes of the intake passages 22a, 22b, 22c, 22d each differ as well. For example, when the section of the intake passage 22a is formed as an ideal circular shape, the sectional shapes of the intake passage 22b, the intake passage 22c, and the intake passage 22d gradually become distorted.

In FIG. 23, the connecting face 26d-1, 26d-2 of the branched lower arm 24d appears as an inclined state. The section at line X-X in FIG. 20 is inclined against line A-A. Therefore, according to the inclined angle, the connecting face 26d-1, 26d-2 appears as an inclined state against the horizontal line.

The connecting face 26d-1, 26d-2 of the branched lower arm 24d and the connecting face 42 of the branched upper arm 32d are connected as shown in FIG. 21. FIG. 24 is a sectional view at line Y-Y in FIG. 20 in the state that the connecting faces are vibration-welded. Line Y-Y is parallel to line A-A. As can be seen in FIG. 24, the lower thick portion 60d of the branched lower arm 24d and the upper thick portion 66d of the branched upper arm 32d project to the inside of the intake passage 22d, and the section of the intake passage 22d is narrowed. Further, in the branched lower arm 24d, the connecting portion for connecting to the upper thick portion 66d of the branched upper arm 32d is thickened. In the branched upper arm 32d, the connecting portion for connecting to the lower thick portion 60d of the branched lower arm 24d is thickened. Since line Y-Y is parallel to line A-A, both of the two connecting faces 26d-1, 26d-2 of the branched lower arm 24d position on the horizontal line H-H.

As can be seen in FIG. 22 and FIG. 23, the intake passages 22b, 22c, 22d cannot be formed as an ideal circular sectional shape like the intake passage 22a. The reason is as follows. The lower thick portion 60 is formed at the branched lower arm 24b, 24c, 24d by die molding of the middle member 18. The upper thick portion 66 is formed at the branched upper arm 32b, 32c, 32d by die molding of the upper member 20.

The lower thick portion 60 and the upper thick portion 66 project to the inside of the intake passage 22b, 22c, 22d. Consequently, the sectional shapes of the intake passages 22b, 22c, 22d each differ and cannot be circular. Thus, the intake air amount of each intake passage 22b, 22c, 22d cannot be evenly obtained. Therefore, there is a problem that desired engine performance cannot be obtained.

In FIG. 20 and FIG. 23, a plurality of intake passages 22a, 22b, 22c, 22d is inclined respectively in a different angle. When one intake passage 22a is formed to have an ideal circular sectional shape against line A-A which is in the standard direction for vibration, the sections of the rest of the three intake passages 22b, 22c, 22d cannot be the ideal shape. In the case that only one intake passage is disposed, when it is not arranged in a specific angle against line A-A which is in the standard direction for vibration, the ideal sectional shape cannot be obtained.

DISCLOSURE OF THE INVENTION

The present invention was devised in view of the abovementioned point. The object is to provide a synthetic resin weld body in which the section of a passage towards a bore can be formed as an ideal shape by welding two pieces of synthetic resin members.

To achieve the abovementioned object, the synthetic resin weld body of the present invention comprises a first member made of synthetic resin which forms a plurality of first passage parts including a plurality of bores, and a second member made of synthetic resin which forms a plurality of second passage parts, wherein the connecting face of the first member with the second member includes top end connecting faces respectively formed around the plurality of bores, mount connecting faces respectively rising from the top end connecting faces, and rising boundary lines which are the boundary between respective top end connecting faces and respective mount connecting faces, wherein a plurality of passages is formed by connecting the first passage part and the second passage part having the first member and the second member connected and vibration-welded in the standard direction for vibration, wherein the passage direction near the bore of at least one passage out of the plurality of passages differs from the orthogonal direction against the direction in which the plurality of bores is lined, wherein the edge at the passage side of the rising boundary line of at least one passage which is disposed in the direction which differs from the orthogonal direction against the direction in which the plurality of bores is lined is disposed at or in the vicinity of a contact point of a tangent line of the ridge line of the mount connecting face at the passage side with the inner edge of the top end connecting face at the bore side, and wherein the rising boundary line including the edge at the passage side is parallel to the standard direction for vibration. Further, in the synthetic resin weld body of the present invention, the vicinity having the axis of said bore as its center is the position where the inner edge of the bore is intersected with the line which angle θ against the orthogonal direction line passing through the axis center of the bore and the contact point of the tangent line is equal to or less than 10 degrees each to the left and the right.

The synthetic resin weld body of the present invention comprises a first member made of synthetic resin which forms one bore and one passage part leading to the bore, and a second member made of synthetic resin which forms one passage part, wherein the connecting face of the first member with the second member includes a top end connecting face formed around the bore, a mount connecting face rising from the top end connecting face, and a rising boundary line which is the boundary between the top end connecting face and the mount connecting face, wherein one passage is formed by connecting the first passage part and the second passage part, having the first member and the second member connected and vibration-welded in the standard direction for vibration, wherein the passage direction near the bore of the passage differs from the orthogonal direction against the standard direction for vibration, wherein the edge at the passage side of the rising boundary line is disposed at or in the vicinity of a contact point of a tangent line of the ridge line of the mount connecting face at the passage side with the inner edge of the top end connecting face at the bore side, and wherein the rising boundary line including the edge at the passage side is parallel to the standard direction for vibration. Further, in the synthetic resin weld body of the present invention, the vicinity having the axis of said bore as its center is the position where the inner edge of the bore is intersected with the line which angle θ against the orthogonal direction line passing through the axis center of the bore and the contact point of the tangent line is equal to or less than 10 degrees each to the left and the right.

With the synthetic resin weld body of the present invention having a plurality of passages, thick portions which are conventionally generated in the plurality of passages projecting to the passage side can be eliminated in both the first member and the second member. Therefore, the sectional shape of each passage can be ideally formed. As a result, by adopting the synthetic resin weld body of the present invention to an intake manifold, intake air is evenly introduced into each cylinder of a multi-cylinder engine, and engine performance can be improved. Further, since the present invention is adoptable to three-dimensional variations, space can be saved and design flexibility can be increased.

Furthermore, with the synthetic resin weld body of the present invention having a passage, thick portions which are conventionally generated in the passage projecting to the passage side can be eliminated in both the first member and the second member. Therefore, the sectional shape of the passage can be ideally formed. Consequently, the passage section can be widened, and the flow amount passing through the passage can be increased than before.

BRIEF DISCRIPTION OF THE DRAWINGS

FIG. 6 is a sectional view of the state that the middle member and the upper member in FIG. 5 are separated.

FIG. 14 is a sectional view showing the state that two constituent members in FIG. 13 are separated.

FIG. 21 is a sectional view showing the connecting portions of a branched lower arm and a branched upper arm.

FIG. 23 is a sectional view showing the state that the middle member and the upper member in FIG. 22 are separated.

BEST MODE FOR CARRYING OUT THE INVENTION

The present invention was devised in order not to generate a thick portion projecting into a passage which conventionally occurs when two constituent members made of synthetic resin are vibration-welded to form one or more passages.

The First Embodiment

Figure 1:
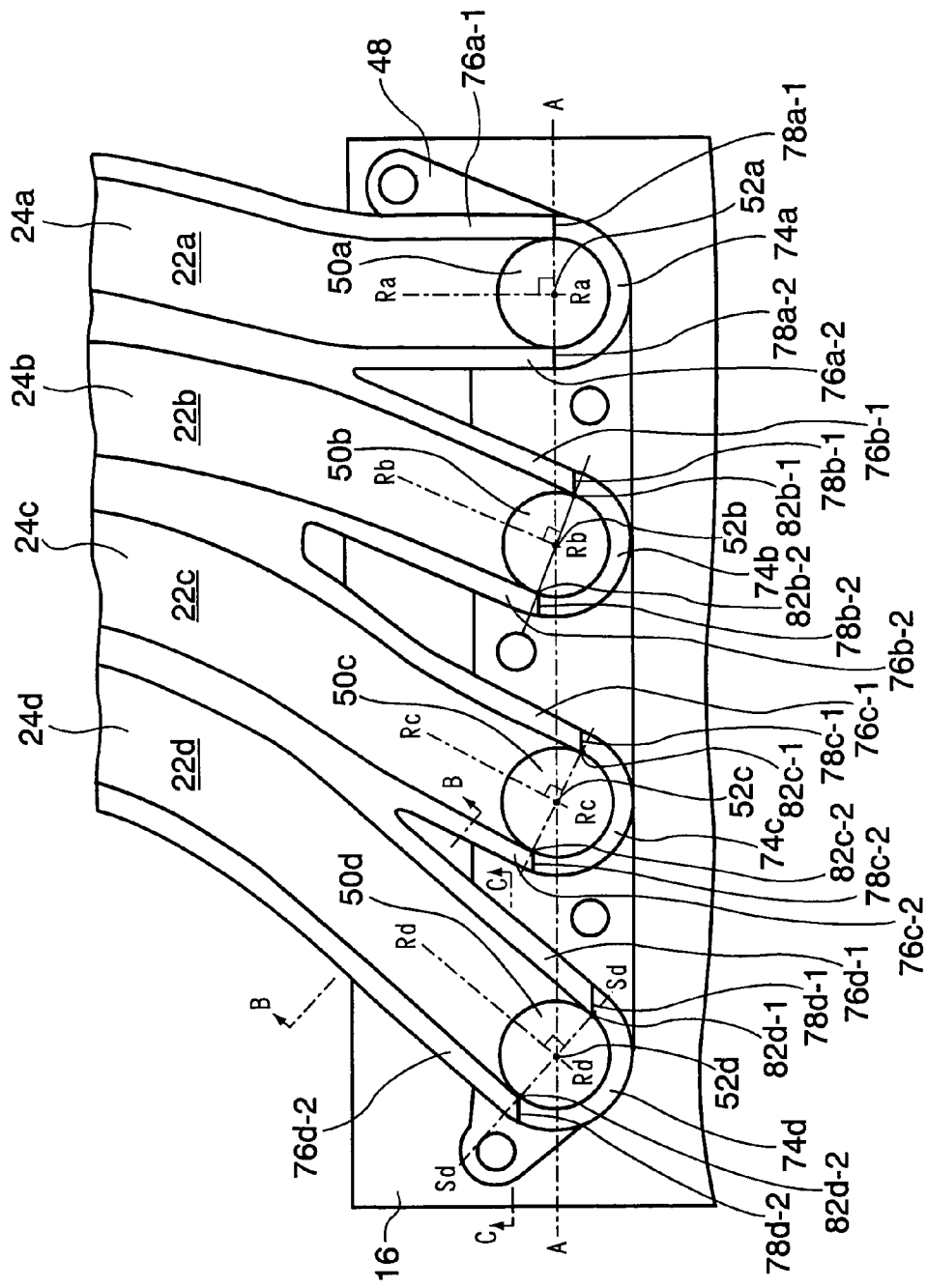
FIG. 1 is a plane view of the main part of a middle member which is utilized for a synthetic resin weld body of the first embodiment of the present invention.
Figure 2:
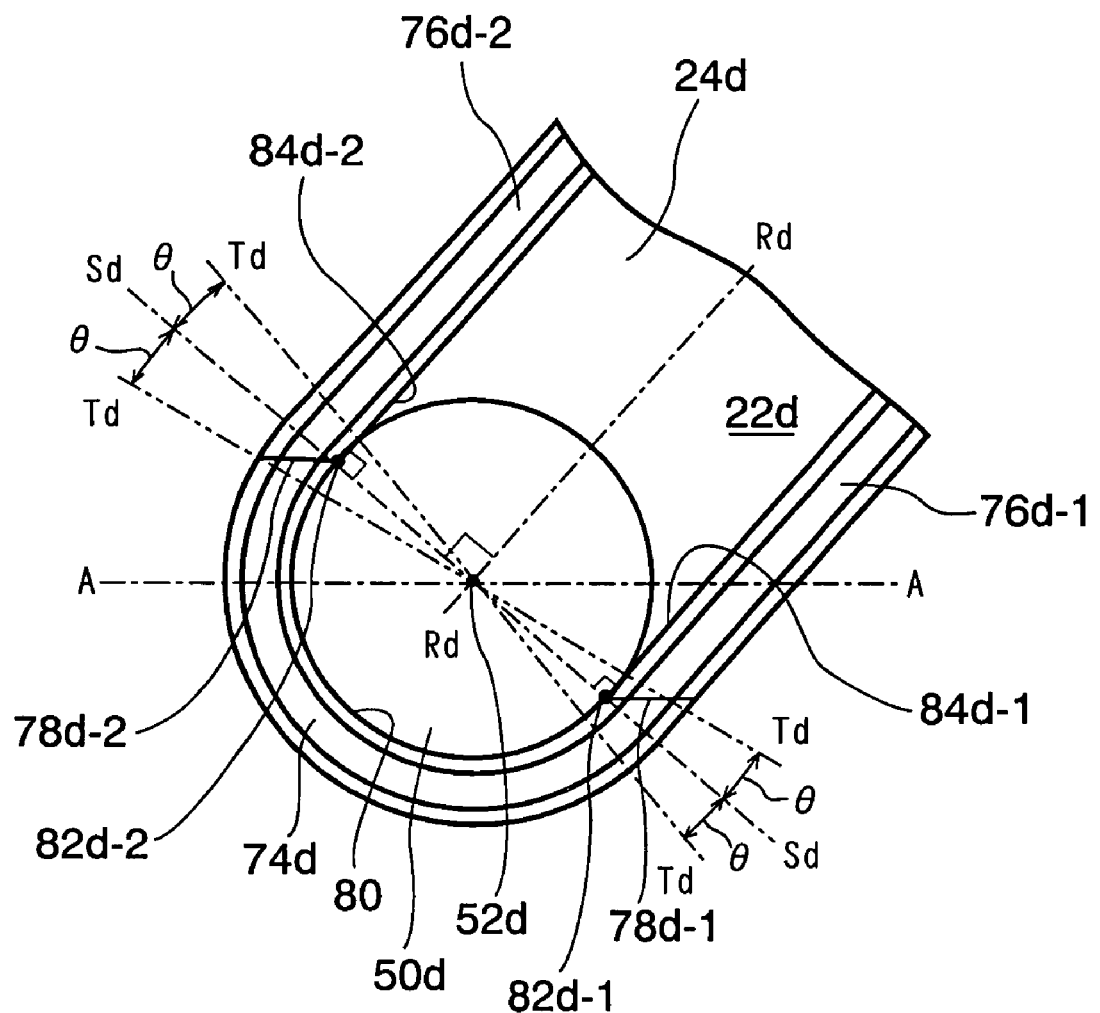
FIG. 2 is an enlarged view of the main part in FIG. 1.
Figure 3:
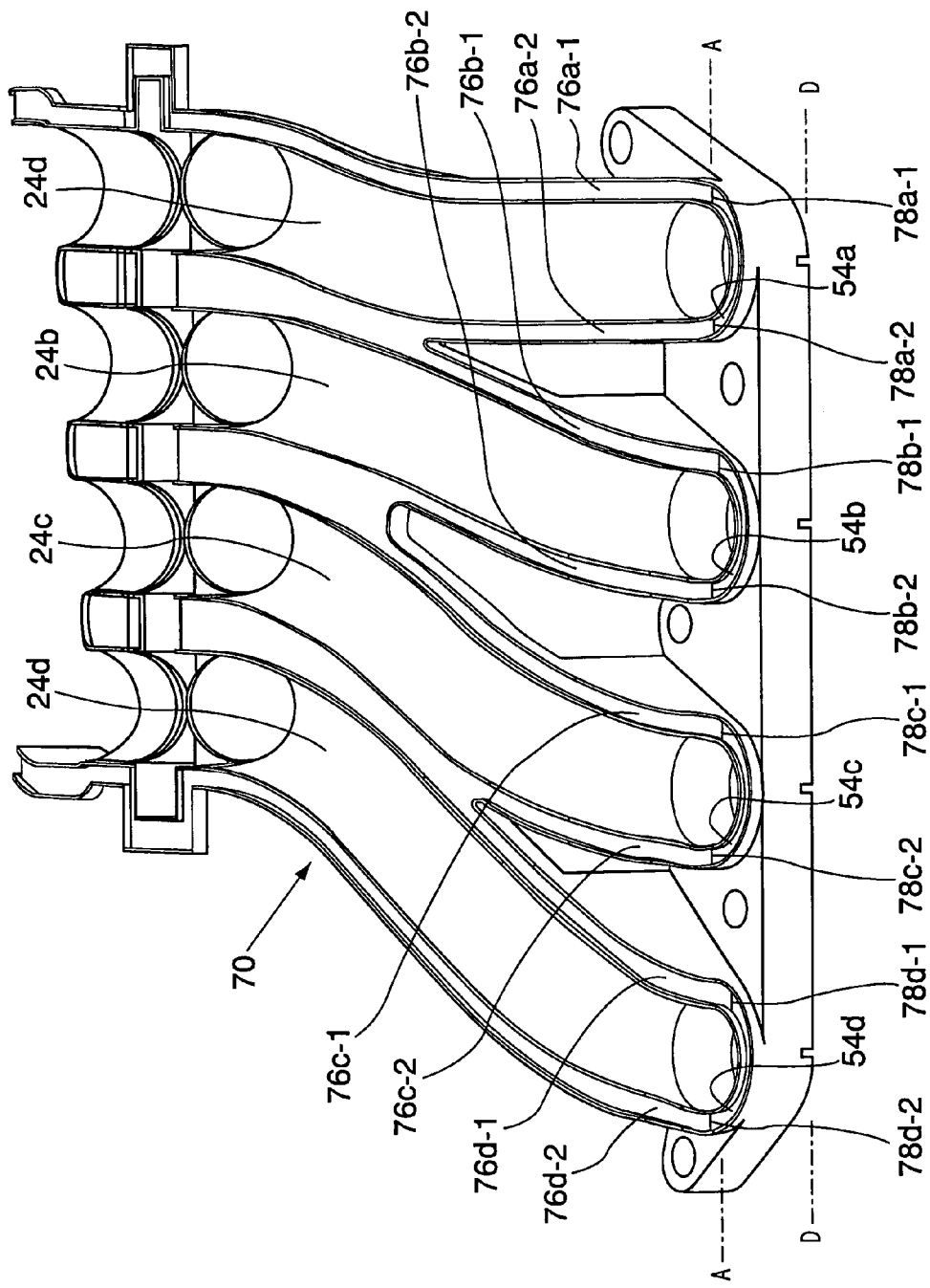
FIG. 3 is a perspective view of the main part of the middle member which is utilized for the present invention.
Figure 4:
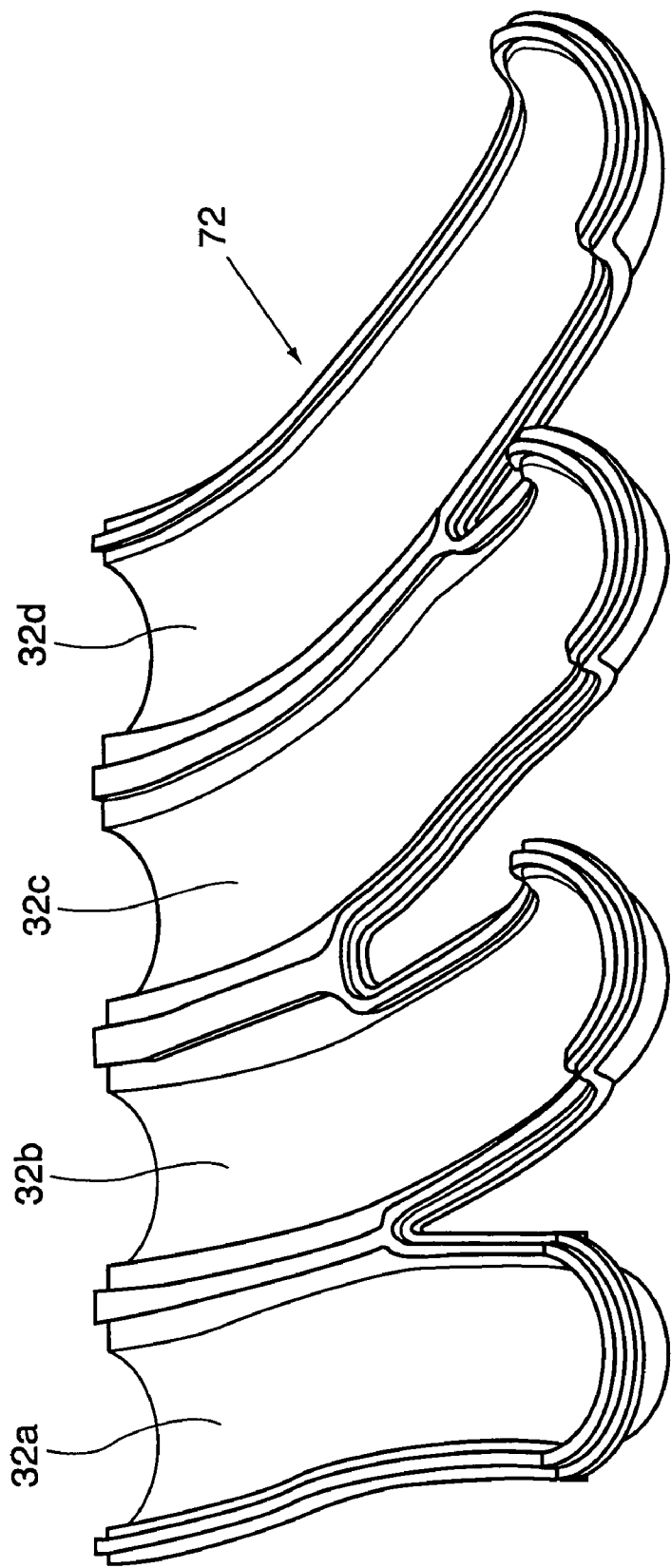
FIG. 4 is a perspective view of the main part of the upper member which is utilized for the present invention.

In the following, the present invention is explained based on the drawings. FIG. 1 is a plane view of the main part of a synthetic resin weld body of the present invention. FIG. 2 is an enlarged view of the main part in FIG. 1. FIG. 3 is a perspective view of the main part of the middle member for the present invention. FIG. 4 is a perspective view of the main part of the upper member for the present invention. In FIG. 1 through 4, the same numeral is given to the same member as in FIG. 16 through 24. A synthetic resin weld body of the present invention is explained by an intake manifold with a plurality of passages (intake passages) as its example. In the present invention, both a middle member 70 as the first member and an upper member 72 as the second member are made of synthetic resin as in the conventional art. It is also the same as the conventional art to fix the connecting faces of the middle member 70 and the upper member 72 by vibration-welding. Here, there is an assumption that although the traveling direction lines Ra, Rb, Rc, Rd direct each intake passage 22a, 22b, 22c, 22d which is a fluid passage towards each bore 50a, 50b, 50c, 50d, at least one traveling direction line differs from the rest of the traveling direction lines.

Figure 20:
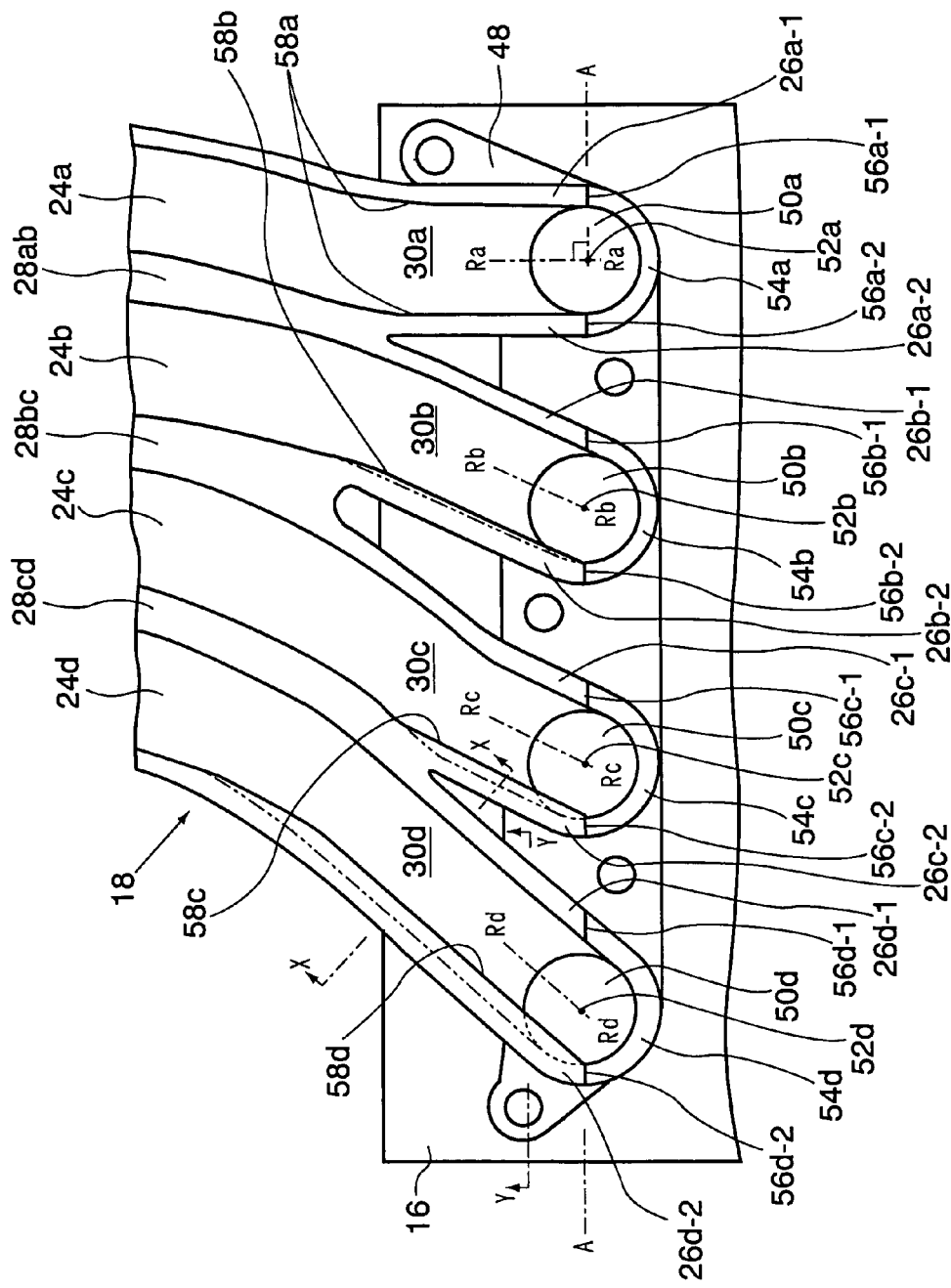
FIG. 20 is a plane view of the engine side of the middle member in FIG. 17.
Figure 22:
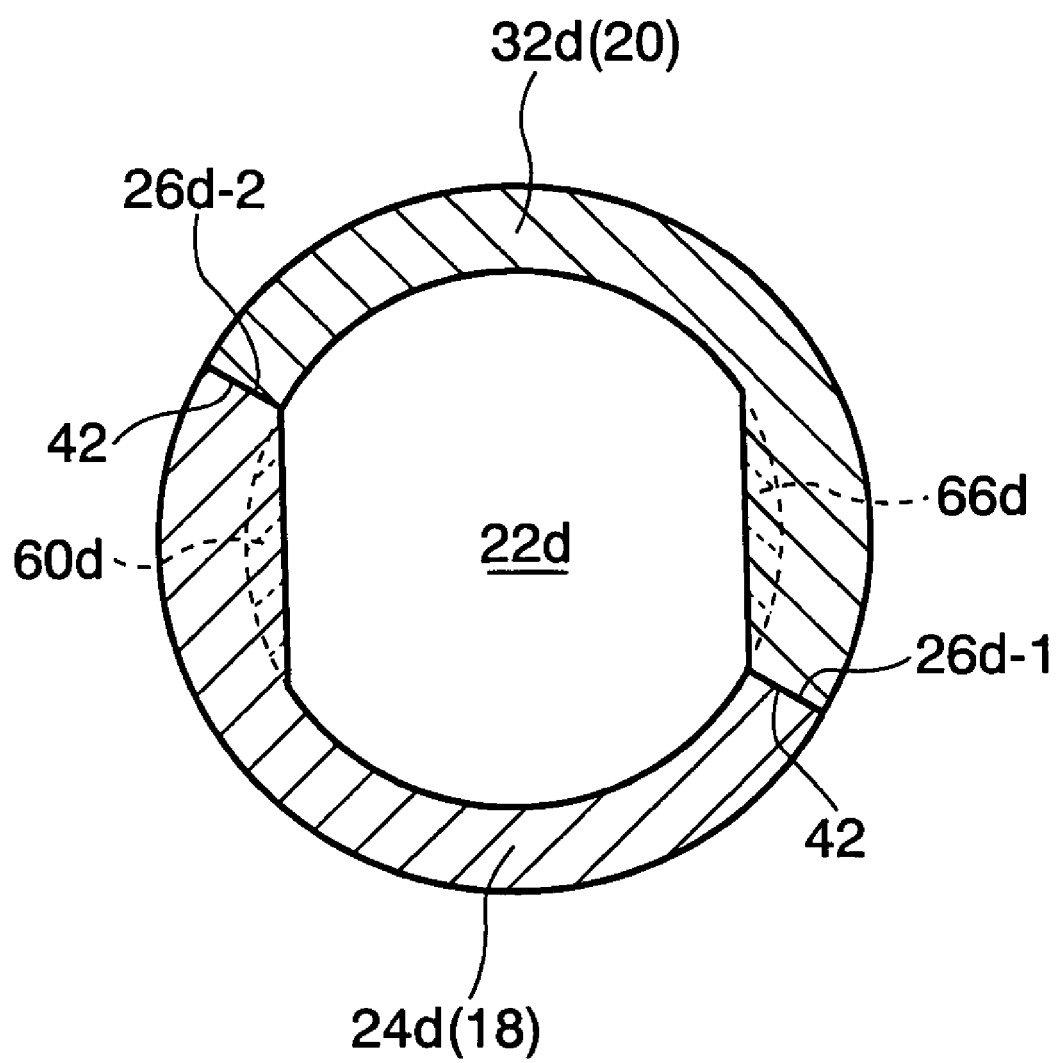
FIG. 22 is a sectional view at line X-X in FIG. 20 of the state that the middle member and the upper member are welded.
Figure 24:
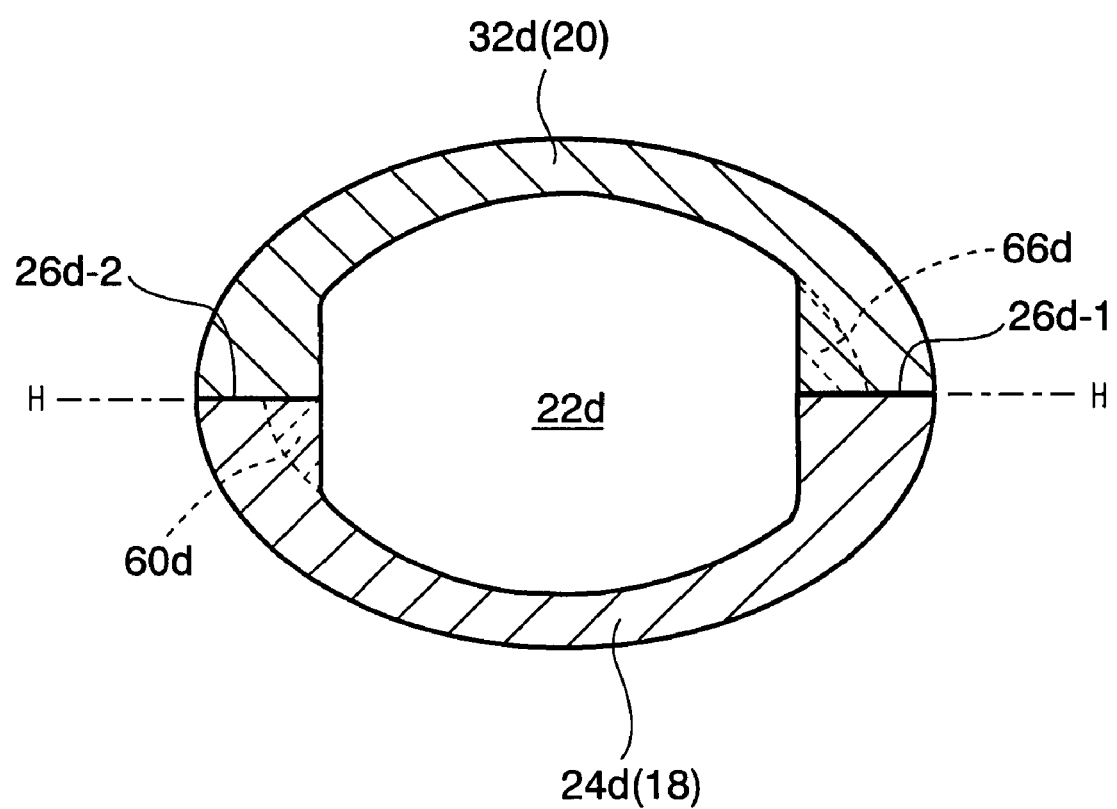
FIG. 24 is a sectional view at line Y-Y in FIG. 20 in the state that the middle member and the upper member are welded.

The main difference of the present invention from the conventional art is that the rising boundary lines 78b-1, 78b-2, 78c-1, 78c-2, 78d-1, 78d-2 between the approximately half-ring-shaped top end connecting faces 74b, 74c, 74d positioning on the same plane and the mount connecting faces 76b-1, 76b-2, 76c-1, 76c-2, 76d-1, 76d-2 in the middle member 70 respectively differ from the rising boundary lines 56b-1, 56b-2, 56c-1, 56c-2, 56d-1, 56d-2 shown in FIG. 20, which are all on the same line as line A-A.

In the present invention, the rising boundary lines 78a-1, 78a-2 between the top end connecting face 74a and the mount connecting face 76a-1, 76a-2 which are related to the intake passage 22a are matched on line A-A, like the rising boundary lines 56a-1, 56a-2 between the top end connecting face 54a and the mount connecting faces 26a-1, 26a-2 shown in FIG. 20. Since the intake passage 22a in the conventional art has an ideal shape, the shape of the intake passage 22a remains as it is in the present invention. Here, in the present invention, the standard direction for vibration to perform vibration-welding also remains the same. That is, for example, the direction perpendicular to the paper of FIG. 16 from the front side towards the back side and vice versa, namely, the direction of line A-A in FIG. 1. However, it is not limited to this direction. Line A-A in FIG. 1 passes through the axis centers 52a, 52b, 52c, 52d of the circular bores 50a, 50b, 50c, 50d.

For the rest of the rising boundary lines 78b-1, 78b-2, 78c-1, 78c-2, 78d-1, 78d-2, the region of the rising boundary lines 78d-1, 78d-2 is enlarged in FIG. 2 and explained based on the drawing in the following. An orthogonal direction line being orthogonal to the traveling direction line Rd of the intake passage 22d having an intersecting point at the axis center 52d of the bore 50d is indicated by Sd. The intersecting point 82d -1, 82d -2 is the position where the orthogonal direction line Sd intersects to the inner edge 80 at the bore 50d side of the top end connecting face 74d, namely, the first position to intersect with the mount connecting face 76d-1, 76d-2. To describe the intersecting point 82d -1, 82d -2 from another viewpoint, the intersecting point 82d -1, 82d -2 corresponds to a contact point of a tangent line of the ridge line 84d-1, 84d-2 of the mount connecting face 76d-1, 76d-2 at the intake passage 22d side with the inner edge 80 of the top end connecting face 74d at the bore 50d side. The rising boundary line 78d-1, 78d-2 is the line crossing the mount connecting face 76d-1, 76d-1 in the parallel direction to line A-A from the intersecting point 82d -1, 82d -2. At the rising boundary line 78d-1, 78d-2, the mount connecting face 76d-1, 76d-2 rises upwards from the top end connecting face 74d. Here, to make vibration-welding possible, the width is arranged to be parallel to the standard direction for vibration at any position of the mount connecting faces 76d-1, 76d-2 respectively rising from the rising boundary lines 78d-1, 78d-2.

The rising boundary lines 78b-1, 78b-2, 78c-1, 78c-2 are arranged as the same as the abovementioned rising boundary lines 78d-1, 78d-2. Since the traveling direction lines Rb, Rc have a smaller elevation angle from line A-A than the traveling direction line Rd, the rising boundary lines 78b-1, 78b-2, 78c-1, 78c-2 which are parallel to line A-A are located closer to line A-A than the abovementioned rising boundary lines 78d-1, 78d-2.

In the middle member 70, the position of the rising boundary line 78a-1, 78a-2, 78b-a, 78b-2, 78c-1, 78c-2, 78d-1, 78d-2, and the shape of the mount connecting face 76a-1, 76a-2, 76b-1, 76b-2, 76c-1, 76c-2, 76d-1, 76d-2 are arranged as mentioned above. The shape of the connecting face of the upper member 72 with the middle member 70 is arranged in order to fit to the above arrangement.

Figure 5:
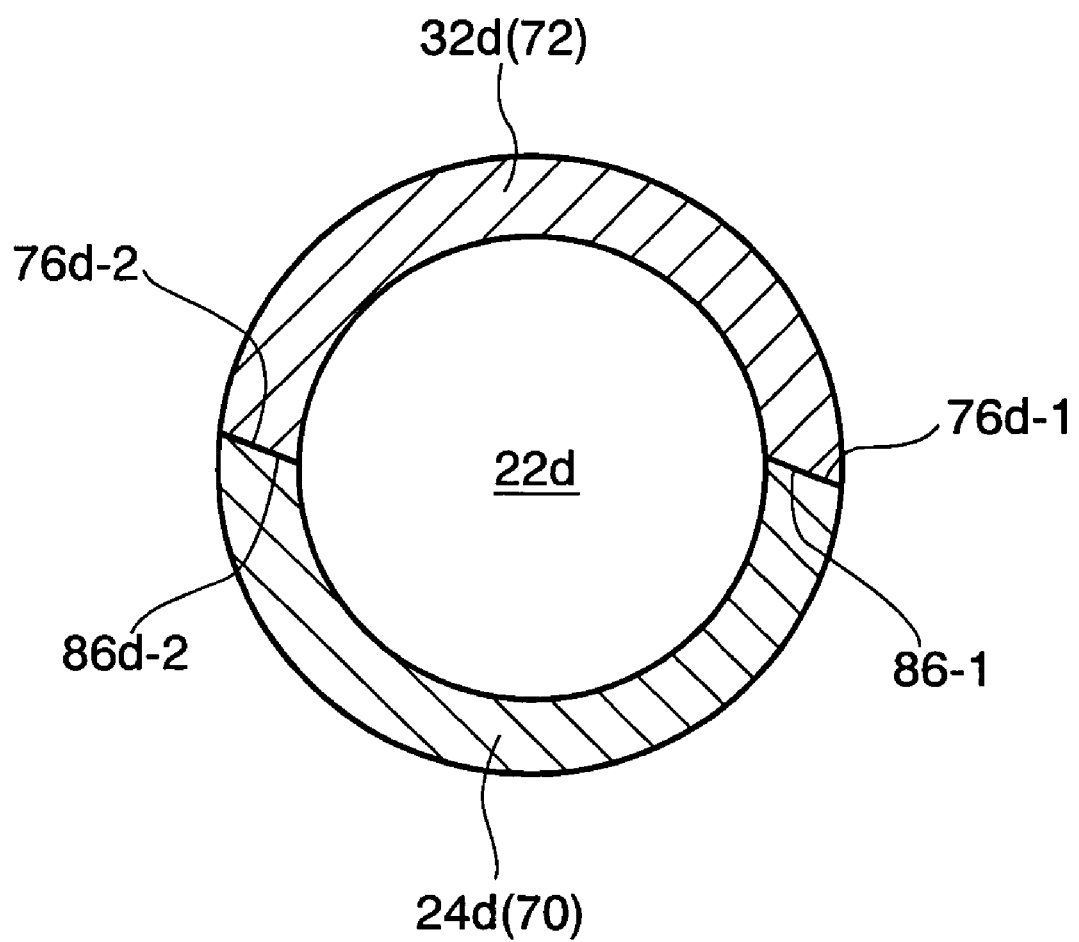
FIG. 5 is a sectional view at line B-B in FIG. 1 of the state that the middle member and the upper member are welded.

FIG. 5 is a sectional view at line B-B of FIG. 1 in the state that the connecting face of the middle member 70 and the connecting face of the upper face 72 are connected and vibration-welded. Line B-B is inclined against line A-A. In FIG. 6, the branched lower arm 24d of the middle member 70 and the branched upper arm 32d of the upper member 72 in FIG. 5 are shown in a separated manner. The connecting faces at the branched lower arm 24d of the middle member 70 are indicated by 76*d*-1, 76*d*-2. The connecting faces at the branched upper arm 32 of the upper member 72 are indicated by 86*d*-1, 86*d*-2.

In FIG. 6, in the case that the branched lower arm 24*d* of the middle member 70 is formed by a die, the die is pulled out in the direction of arrow Z1. The inner ridge line 84*d*-1 of the mount connecting face 76*d*-1 and the inner ridge line 84*d*-2 of the mount connecting face 76*d*-2 are on the same plane H1, and are the farthest from each other in the left-right direction. Therefore, at the inner wall 89 of the branched lower arm 24*d*, there is no portion which is dented from the inner ridge line 84*d*-1 and the inner ridge line 84*d*-2. Then, the inner-ridge line 84*d*-1 and the inner ridge line 84*d*-2 do not project to the lower passage space 30*d* of the branched lower arm 24*d* beyond some point. Therefore, a thick portion is neither formed below the inner ridge line 84*d*-1 nor below the inner ridge line 84*d*-2. In the same manner, a thick portion is not formed at the branched lower arms 24*b*, 24*c* of the middle member 70.

In FIG. 6, in the case that the branched upper arm 32*d* of the upper member 72 is formed by a die, the die is pulled out in the direction of arrow Z2. The inner ridge line 90*d* -1 of the connecting face 86*d*-1 and the inner ridge line 90*d* -2 of the connecting face 86*d*-2 of the branched upper arm 32*d* are on the same plane H2, and are the farthest from each other in the left-right direction. Therefore, at the inner wall 91 of the branched upper arm 32*d*, there is no portion which is dented from the inner ridge line 90*d*-1 and the inner ridge line 90*d*-2. Then, the inner ridge line 90*d*-1 and the inner ridge line 90*d*-2 do not project to the upper passage space 34*d* of the branched upper arm 32*d* beyond some point. Therefore, a thick portion is neither formed above the inner ridge line 90*d*-1 nor above the inner ridge line 90*d*-2. In the same manner, a thick portion is not formed at the branched upper arms 32*b*, 32*c* of the upper member 72.

Figure 7:
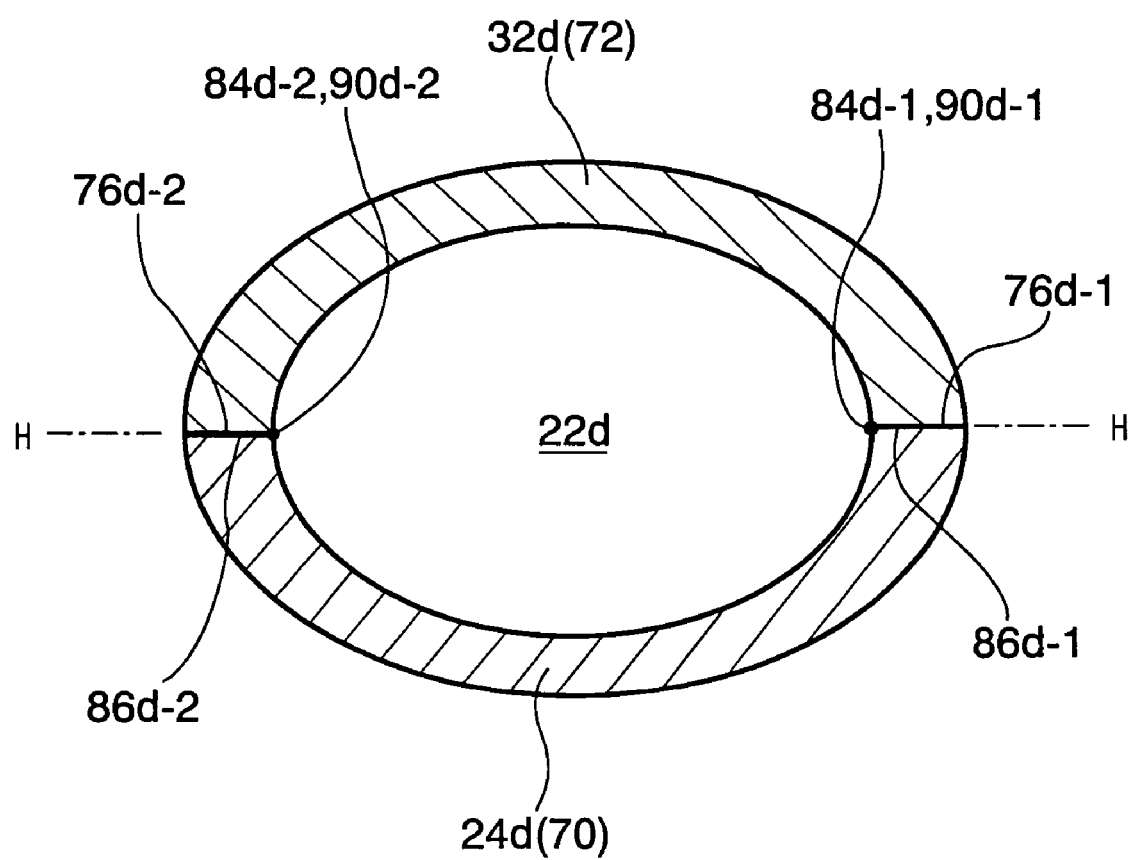
FIG. 7 is a sectional view at line C-C in FIG. 1 of the state that the middle member and the upper member are welded.

FIG. 7 is a sectional view at line C-C in FIG. 1, which is parallel to line A-A, in the state that the connecting face of the middle member 70 and the connecting face of the upper member 72 are vibration-welded. In FIG. 7, the connecting face 76*d*-1, 76*d*-2 of the branched lower arm 24*d* of the middle member 70 and the connecting face 86*d*-1, 86*d*-2 of the branched upper arm 32*d* of the upper member 72 locate on the same plane H. In FIG. 7, the inner ridge lines 84*d*-1, 84*d*-2 of the connecting faces 76*d*-1, 76*d*-2 of the branched lower arm 24*d* and the inner ridge lines 90*d*-1, 90*d*-2 of the connecting faces 86*d*-1, 86*d*-2 of the branched upper arm 32*d* do not project to the intake passage 22*d*. Therefore, no thick portion is formed.

As mentioned above and shown in FIG. 5 and FIG. 7, sectional shapes of all the intake passages 22*a*, 22*b*, 22*c*, 22*d* can be circular which is the ideal shape as shown in FIG. 5 by fixing the middle member 70 having branched lower arms 24*a*, 24*b*, 24*c*, 24*d* without a thick portion and the upper member 72 having branched upper arms 32*a*, 32*b*, 32*c*, 32*d* without a thick portion.

In the abovementioned explanation, the edge of the rising boundary line 78*d*-1, 78*d*-2 at the intake passage 22*d* side is located at the intersecting point 82*d*-1, 82*d*-2 which is a contact point of a tangent line of the ridge line 84*d*-1, 84*d*-2 of the mount connecting face 76*d*-1, 76*d*-2 with the inner edge 80 of the top end connecting face 74*d* at the bore 50*d* side. However, the edge of the rising boundary line 78*d*-1, 78*d*-2 at the intake passage 22*d* side can also be located in the vicinity of the ideal point, and not exactly at the ideal point which is the intersecting point 82*d*-1, 82*d*-2. Even in the case that the edge of the rising boundary line 78*d*-1, 78*d*-2 at the intake passage 22*d* side is located in the vicinity of the intersecting point 82*d*-1, 82*d*-2, the section of the intake passage 22*d* is nearly circular, and the difference of the intake amount is relatively small compared with the ideal sectional shape.

In FIG. 2, the vicinity of the ideal point is defined as the region that the angle θ from the orthogonal direction line Sd passing through the intersecting line 82*d*-1, 82*d*-2 having its center at the axis center 52*d* of the bore 50*d* is equal to or less than 10 degrees each to the left and the right. Namely, the limit points are the points where the two lines Td being 10 degrees each to the left and the right from the orthogonal line Sd having its center at the axis center 52*d* intersect to the inner edge 80 at the bore 50*d* side in FIG. 2.

Figure 8:
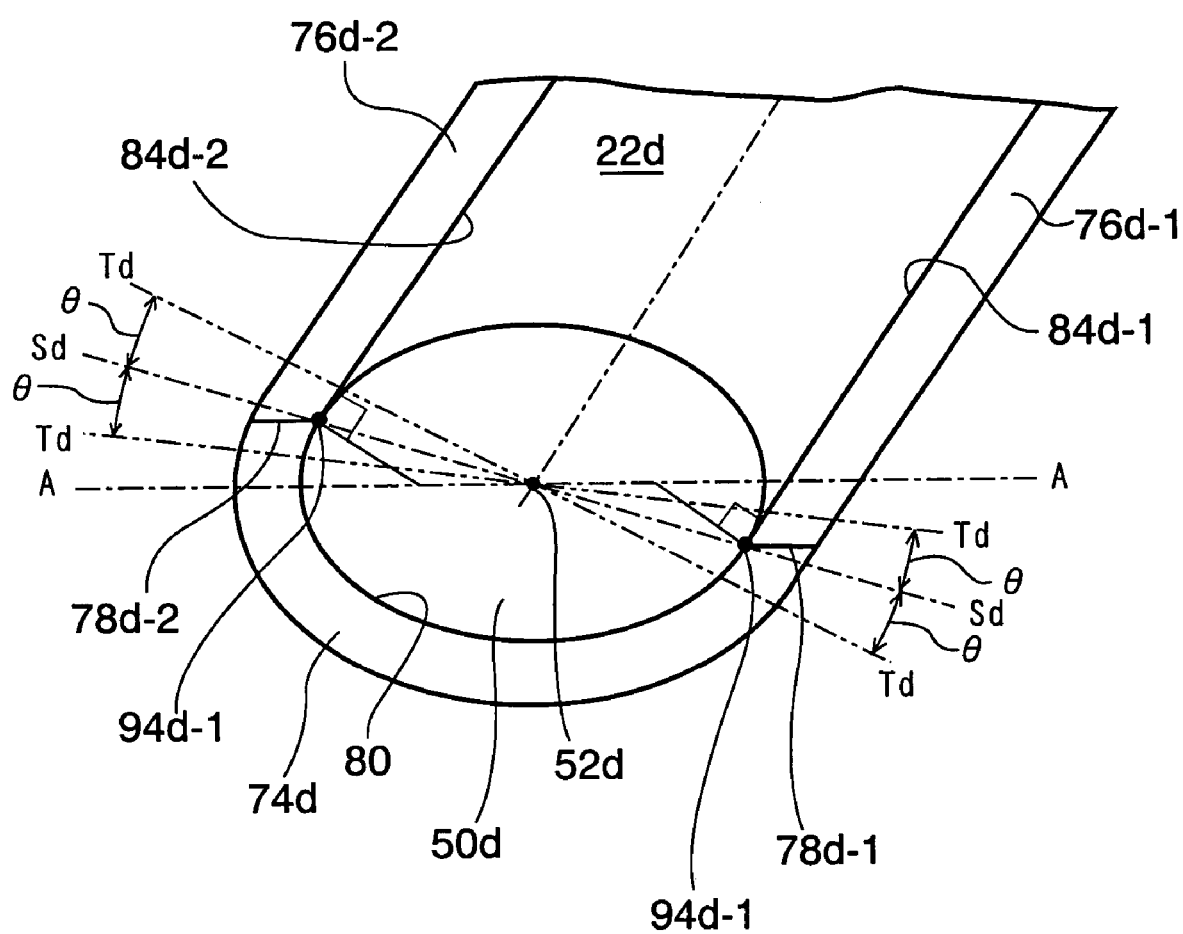
FIG. 8 is a view corresponding to FIG. 2 in which the section of the intake passage is oval.

In FIG. 1, FIG. 2, FIG. 3 and FIG. 5, the sectional shapes of the intake passages 22*a*, 22*b*, 22*c*, 22*d* are explained as being circular. However, an intake passage which section is oval can also be applied. FIG. 8 corresponds to FIG. 2 in which the section of the intake passage is oval. The edge of the rising boundary line 78*d*-1, 78*d*-2 at the intake passage 22*d* side is the intersecting point 94*d*-1, 94*d*-2. The intersecting point 94*d*-1, 94*d*-2 corresponds to a contact point of a tangent line of the ridge line 84*d*-1, 84*d*-2, of the mount connecting face 76*d*-1, 76*d*-2 at the intake passage 22*d* side with the inner edge 80 of the top end connecting face 74*d* at the oval bore 50*d* side. The rising boundary line 78*d*-1, 78*d*-2 is the line crossing the mount connecting face 76*d*-1, 76*d*-2 in the parallel direction to line A-A from the intersecting point 94*d*-1, 94*d*-2. In this manner, even when the section of the intake passage is oval, as mentioned above, a thick portion is neither formed below the inner ridge line 84*d*-1 nor below the inner ridge line 84*d*-2 when the middle member 70 is formed by a die. As the same as above, a thick portion is not formed at the branched lower arms 24*b*, 24*c* of the middle member 70. In the same manner, a thick portion is not formed at the branched upper arms 32*b*, 32*c*, 32*d* of the upper member 72.

In the oval-shaped intake passage 22*d*, the edge of the rising boundary line 78*d*-1, 78*d*-2 at the intake passage 22*d* side can also be located in the vicinity of the ideal point, and not exactly at the ideal point which is the intersecting point 94*d*-1, 94*d*-2. Even in the case that the edge of the rising boundary line 78*d*-1, 78*d*-2 at the intake passage 22*d* side is located in the vicinity of the intersecting point 94*d*-1, 94*d*-2, the section of the intake passage 22*d* is nearly oval, and the difference of the intake amount is relatively small compared with the ideal sectional shape.

In FIG. 8, the vicinity of the ideal point is defined as the range that the angle θ from the orthogonal direction line Sd passing through the intersecting line 94*d*-1, 94*d*-2 having its center at the axis center 52*d* of the oval bore 50*d* is equal to or less than 10 degrees each to the left and the right. Namely, the limit points are the points where the two lines Td being 10 degrees each to the left and the right from the orthogonal line Sd having its center at the axis center 52*d* intersect to the inner edge 80 at the oval bore 50*d* side in FIG. 8.

In the abovementioned explanation, one intake passage 22*a* is disposed in the orthogonal direction to a line (line A-A) which is in the standard direction for vibration, and three intake passages 22*b*, 22*c*, 22*d* are disposed in different directions from the orthogonal direction to line A-A. However, some manifolds for outboard engines have a structure that all intake passages are parallel and disposed in a different direction from the orthogonal direction to line A-A. The present invention can be applied to such manifolds for outboard engines as well.

Further, in the abovementioned explanation, it is explained that no thick portion is generated at all three intake passages 22*b*, 22*c*, 22*d* which are disposed in different directions from the orthogonal direction to a line (line A-A) which is in the standard direction for vibration. However, it is possible to apply the present invention to only a few passages in which a thick portion is formed out of a plurality of intake passages which are disposed in different directions from the orthogonal direction to line A-A. Further, the section of the intake passage is not only limited to a circle which is the ideal shape, but also can be an oval shape or another.

The Second Embodiment

Figure 9:
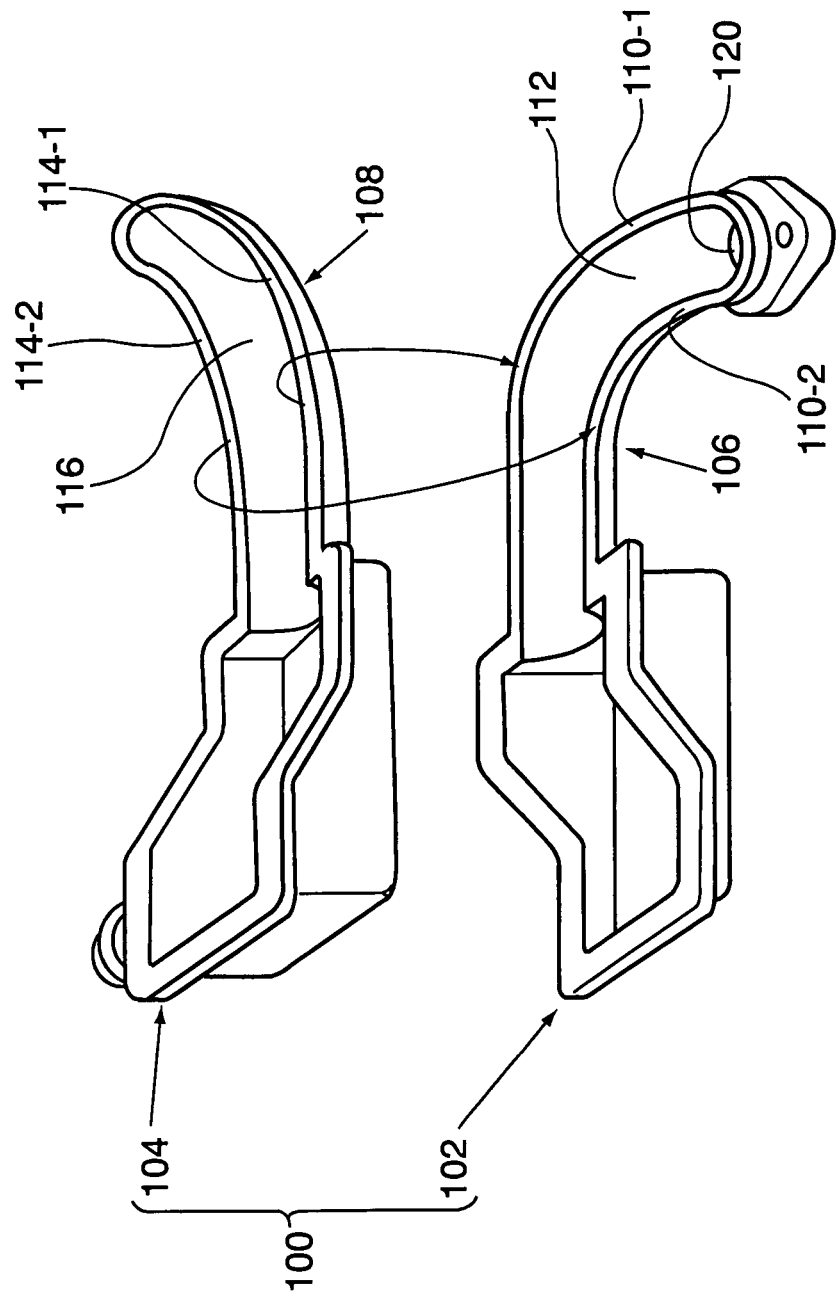
FIG. 9 is a perspective view of the two members forming a synthetic resin weld body of the second embodiment of the present invention showing an opened state that one member is reversed.
Figure 10:
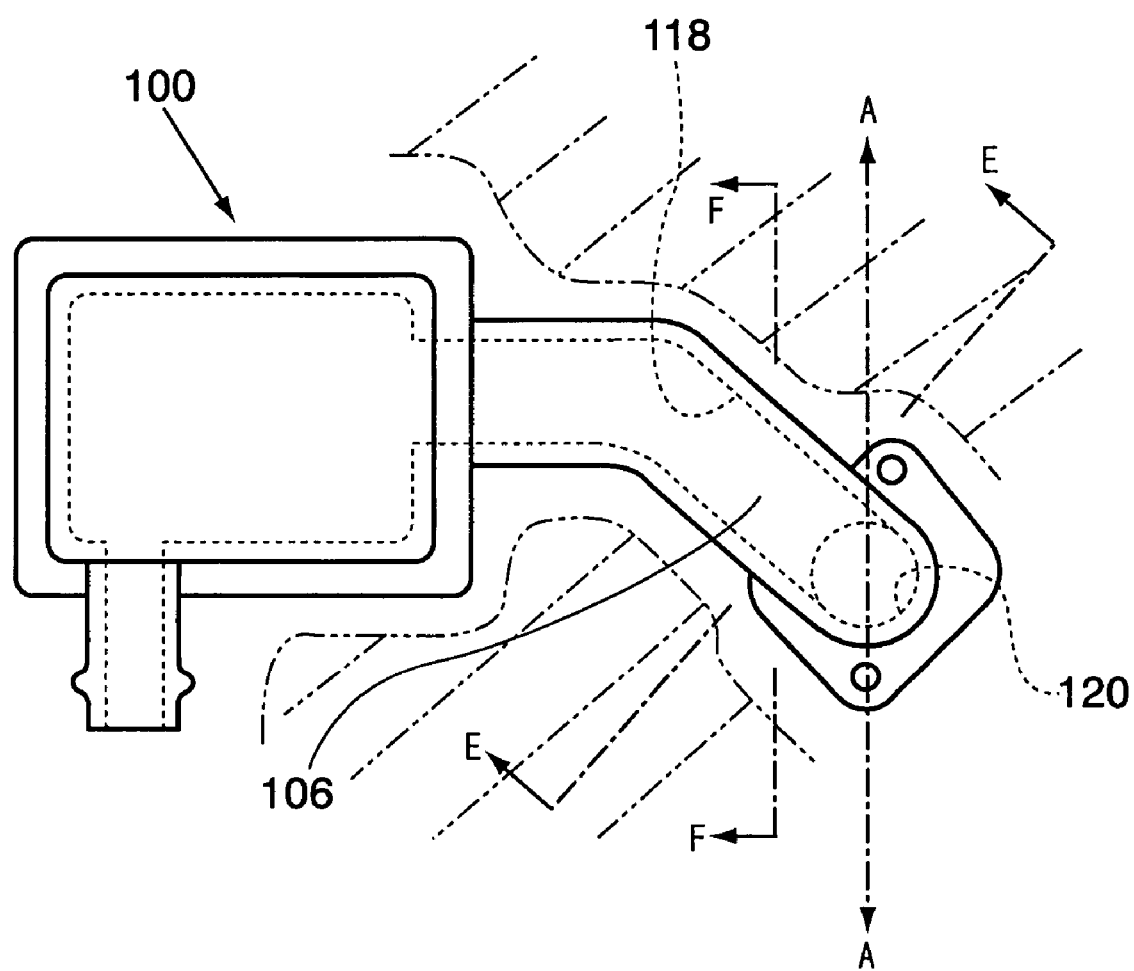
FIG. 10 is a plane view of the state that two constituent members in FIG. 9 are welded.
Figure 11:
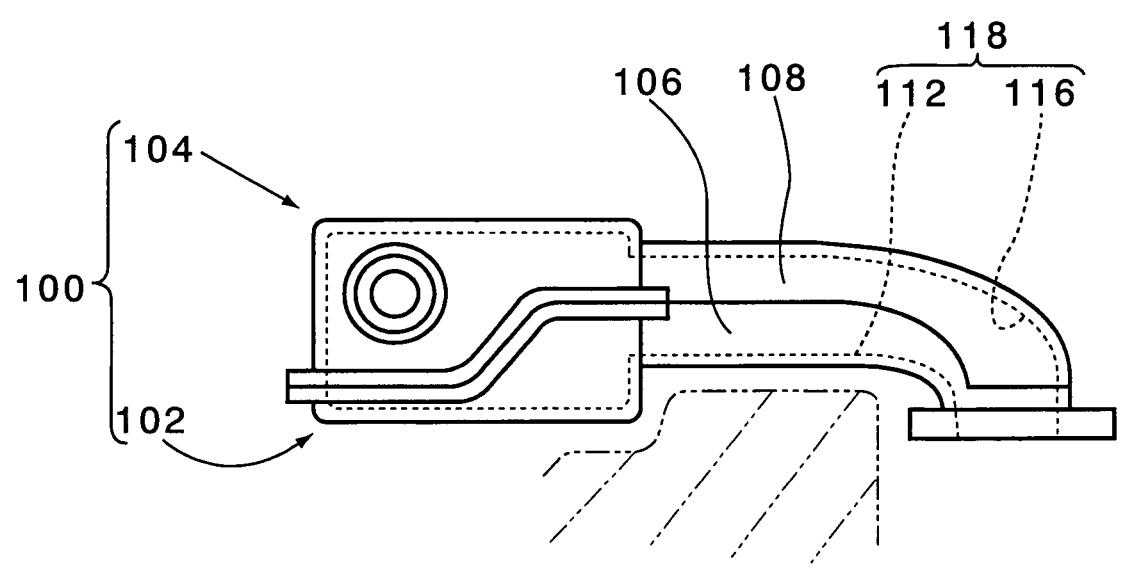
FIG. 11 is a front view of the state that two constituent members in FIG. 9 are welded.

Another embodiment of the present invention is explained in the following. FIG. 9 is a perspective view of two members forming a synthetic resin weld body of the second embodiment of the present invention showing an opened state that one member is reversed. FIG. 10 is a plane view in the state that two constituent members in FIG. 9 are welded. FIG. 11 is a front view in the state that two constituent members in FIG. 9 are welded. As shown in FIG. 9, a synthetic resin weld body 100 of the second embodiment comprises a first member 102 and a second member 104. Both the first member 102 and the second member 104 are made of synthetic resin. The first member 102 has a first arm 106 which shape is, for example, a half pipe being cut in the axis direction and bended in a desired form. The second member 104 has a second arm 108 which shape is, for example, a half pipe being cut in the axis direction and bended into a desired form. An introducing pipe 109 to introduce fluid such as air etc. into a passage 118, which will be mentioned later, is attached to the second member 104.

Mount connecting faces 110-1, 110-2 respectively for the left and right are formed at both sides of the first arm 106. A first passage space 112 is formed as a dent between the mount connect faces 110-1, 110-2 respectively for the left and right. In the same manner, a pair of mount connecting faces 114-1, 114-2 is formed at both sides of the second arm 108. A second passage space 116 is formed as a dent between the pair of mount connecting faces 114-1, 114-2.

The mount connecting face 110-1 of the first arm 106 and the mount connecting face 114-1 of the second arm 108 are connected, and the mount connecting face 110-2 of the first arm 106 and the mount connecting face 114-2 of the second arm 108 are connected. Then, vibration-welding is performed at the connecting portions so that the first arm 106 and the second arm 108 are welded by ultrasonic vibration. (At that time, other connecting faces of the first member 102 and the second member 104 are welded simultaneously.) In this manner, the first passage space 112 and the second passage space 116 are connected, and a passage 118 is formed, as shown in FIG. 10 and FIG. 11. A bore 120 is formed in the first member 102, as shown in FIG. 9 and FIG. 10. The bore 120 is connected to the passage 118 (the first passage space 112). In the second embodiment, there is one passage 118 for fluid, and one bore 120 which is connected to the passage 118.

Figure 12:
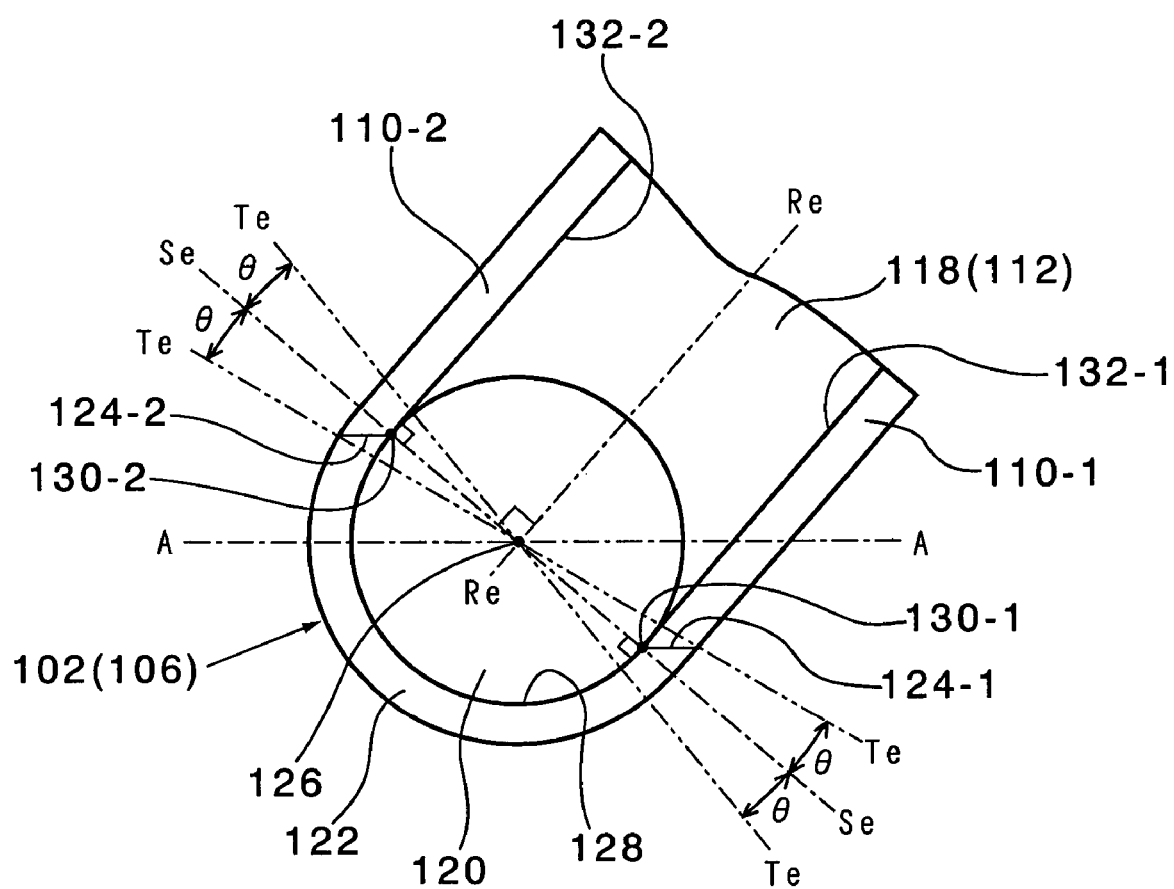
FIG. 12 is an enlarged plane view of a main part of one constituent member shown in FIG. 9.

In this embodiment, as shown in FIG. 12, it is explained that the traveling direction line Re of the passage 118 (the first passage space 112) in the vicinity of the bore 120 towards the bore 120 is in a different direction from the orthogonal direction to the vibration-welding direction A-A. Namely, in the first member 102, rising boundary lines 124-1, 124-2 from the approximately half-ring-shaped top end connecting face 122 which positions on the same plane around the bore 120 to the mount connecting faces 110-1, 110-2 are not the same as the standard line for vibration, line A-A, which includes the axis center 126 of the bore 120.

An orthogonal direction line being orthogonal to the traveling direction line Re of the passage 118 having an intersecting point at the axis center 126 of the bore 120 is indicated as Se. Positions where the orthogonal direction line Se intersects to the inner edge 128 at the bore 120 side of the top end connecting face 122, namely, the positions first to intersect to the mount connecting faces 110-1, 110-2, are intersecting points 130-1, 130-2. To describe the intersecting point 130-1, 130-2 from another viewpoint, the intersecting point 130-1, 130-2 corresponds to a contact point of a tangent line of the inner ridge line 132-1, 132-2 of the mount connecting face 110-1, 110-2 at the passage 118 side with the inner edge 128 of the top end connecting face 122 at the bore 120 side. The rising boundary line 124-1, 124-2 is the line crossing the mount connecting face 110-1, 110-1 in the direction being parallel to line A-A from the intersecting point 130-1, 130-2. At the rising boundary line 124-1, 124-2, the mount connecting face 110-1, 110-2 rises upwards from the top end connecting face 122. Here, to make vibration-welding possible, the width is arranged to be parallel to the standard direction for vibration at any position of the mount connecting faces 110-1, 110-2 respectively rising from the rising boundary lines 124-1, 124-2.

In the first member 102, the position of the rising boundary line 124-1, 124-2 and the shape of the mount connecting face 110-1, 110-2 are arranged as mentioned above. The shape of the connecting face (the mount connecting faces 114-1, 114-2 etc.) of the second member 104 with the first member 102 is arranged in order to fit the above arrangement.

Figure 13:
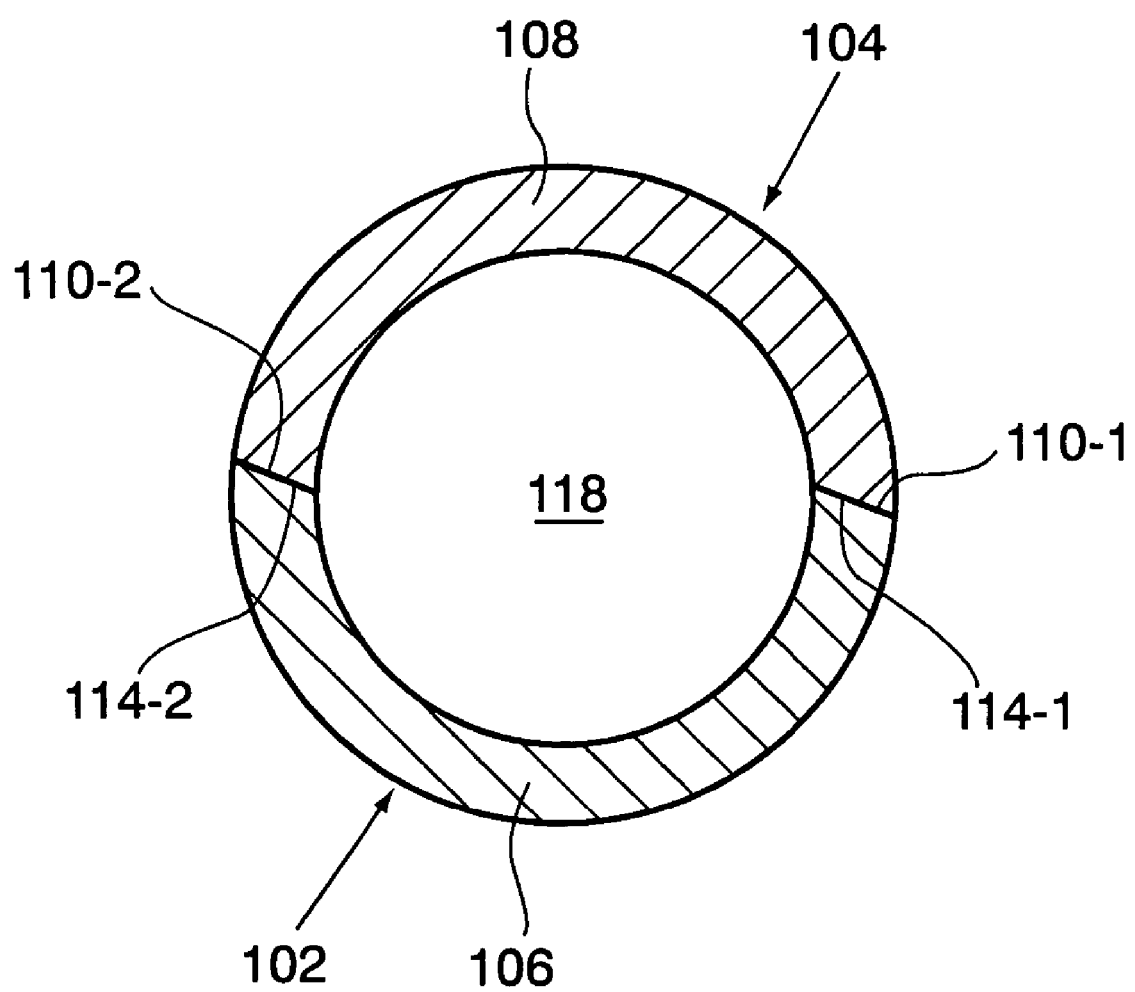
FIG. 13 is a sectional view at line E-E in FIG. 10.

FIG. 13 is a sectional view at line E-E of FIG. 10 in the state that the first arm 106 of the first member 102 and the second arm 108 of the second member 104 are connected and the connecting faces are vibration-welded. Line E-E is inclined against (not parallel to) line A-A which is in the welding vibration direction. In FIG. 14, the first arm 106 of the first member 102 and the second arm 108 of the second member 104 in FIG. 13 are shown in a separated manner.

In FIG. 14, in the case that the first arm 106 of the first member 70 is formed by a die, the die is pulled out in the direction of arrow Z1. The inner ridge line 132-1 of the mount connecting face 110-1 and the inner ridge line 132-2 of the mount connecting face 110-2 are on the same plane H1, and are the farthest from each other in the left-right direction. Therefore, at the inner wall 134 of the first arm 106, there is no portion which is dented from the inner ridge line 132-1 and the inner ridge line 132-2. Then, the inner ridge line 132-1 and the inner ridge line 132-2 do not project to the first passage space 112 of the first arm 106 beyond some point. Therefore, a thick portion is formed neither below the inner ridge line 132-1 nor below the inner ridge line 132-2.

In FIG. 14, in the case that the second arm 108 of the second member 104 is formed by a die, the die is pulled out in the direction of arrow Z2. The inner ridge line 136-1 of the connecting face 114-1 and the inner ridge line 136-2 of the connecting face 114-2 of the second arm 108 are on the same plane H2 and are the farthest from each other in the left-right direction. Therefore, at the inner wall 138 of the second arm 108, there is no portion which is dented from the inner ridge line 136-1 and the inner ridge line 136-2. Then, the inner ridge line 136-1 and the inner ridge line 136-2 do not project to the second passage space 116 of the branched upper arm 32*d* beyond some point. Therefore, a thick portion is formed neither above the inner ridge line 136-1 nor above the inner ridge line 136-2.

Figure 15:
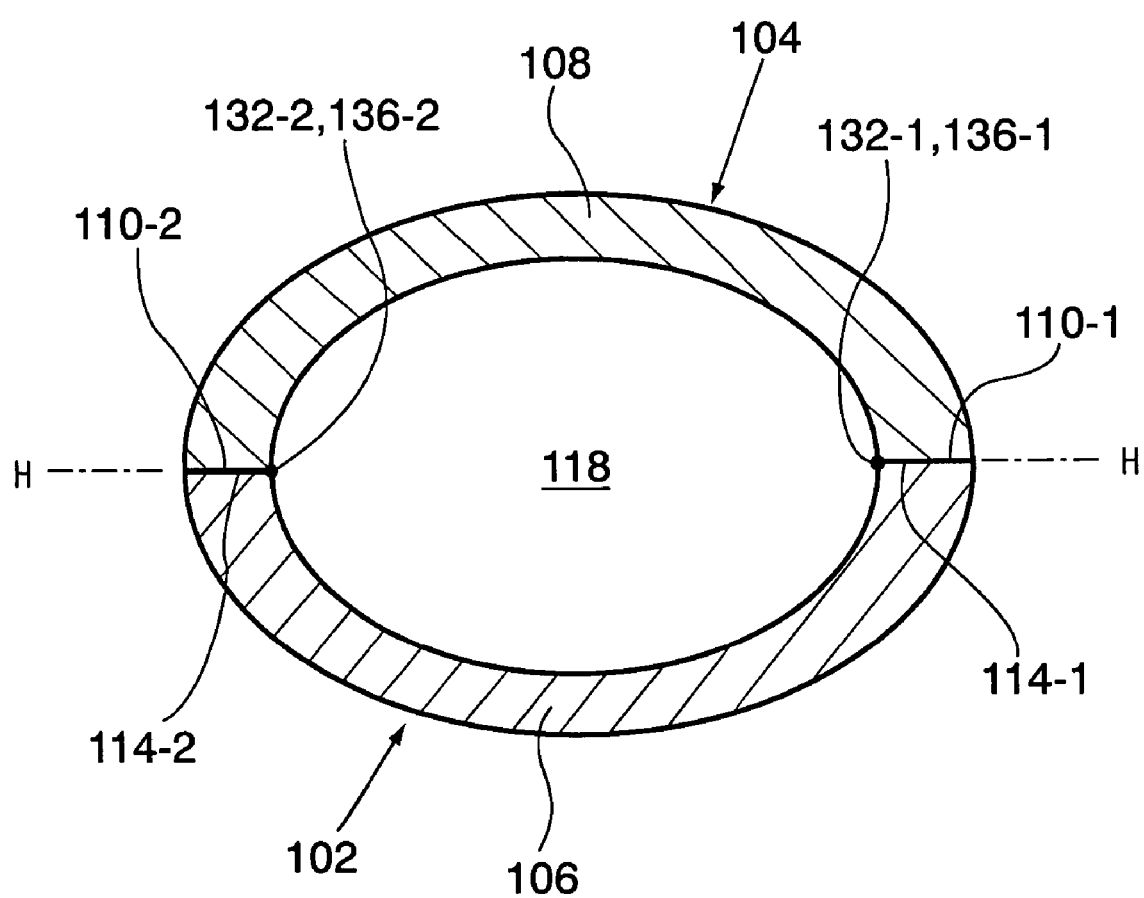
FIG. 15 is a sectional view at line F-F in FIG. 10.
Figure 16:
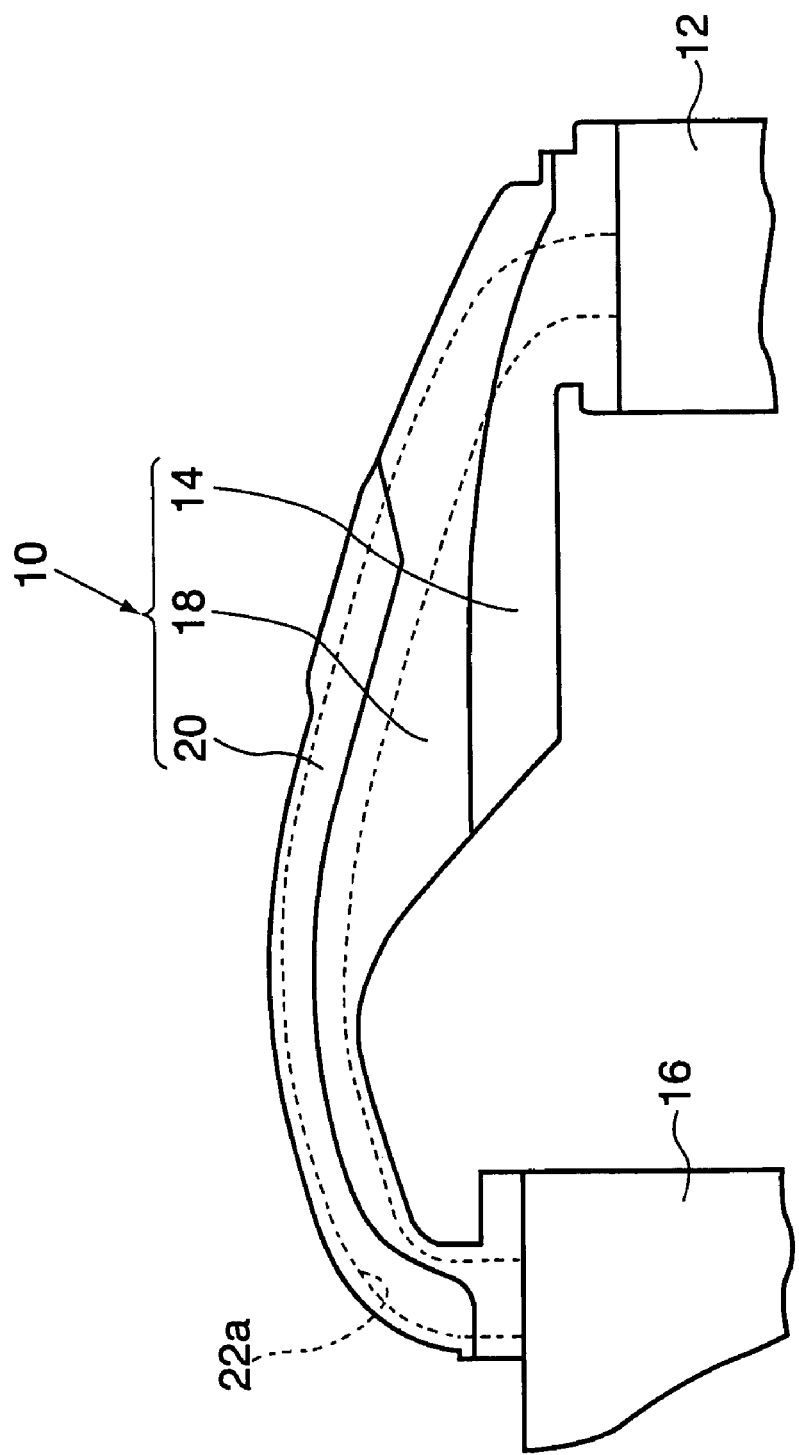
FIG. 16 is a front view of a conventionally known intake manifold.
Figure 17:
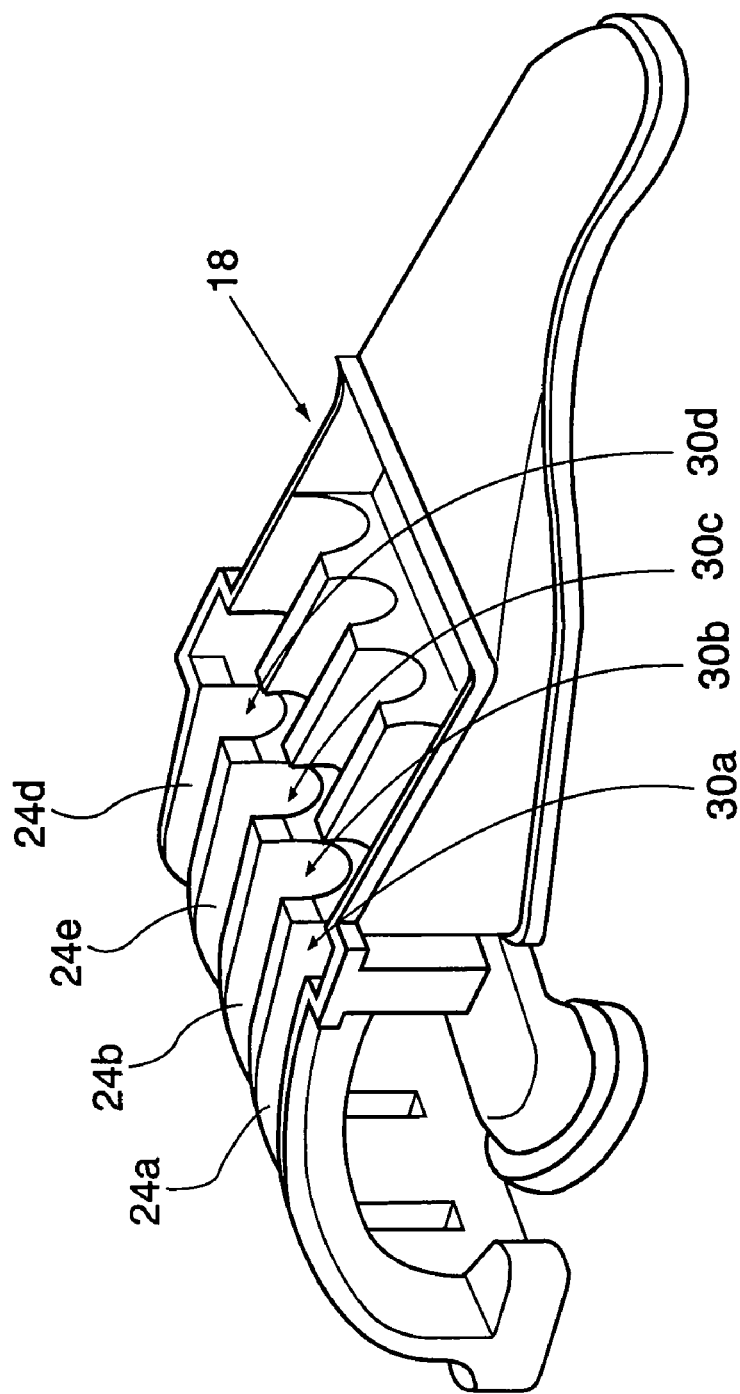
FIG. 17 is a perspective view of a middle member which constitutes the intake manifold.
Figure 18:
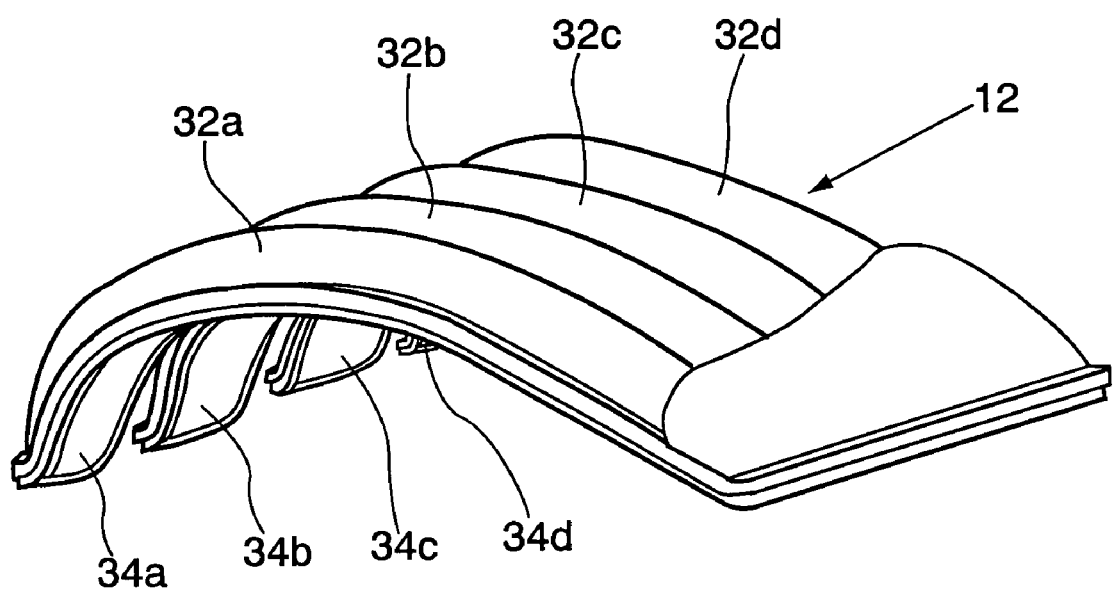
FIG. 18 is a perspective view of an upper member which constitutes the intake manifold.
Figure 19:
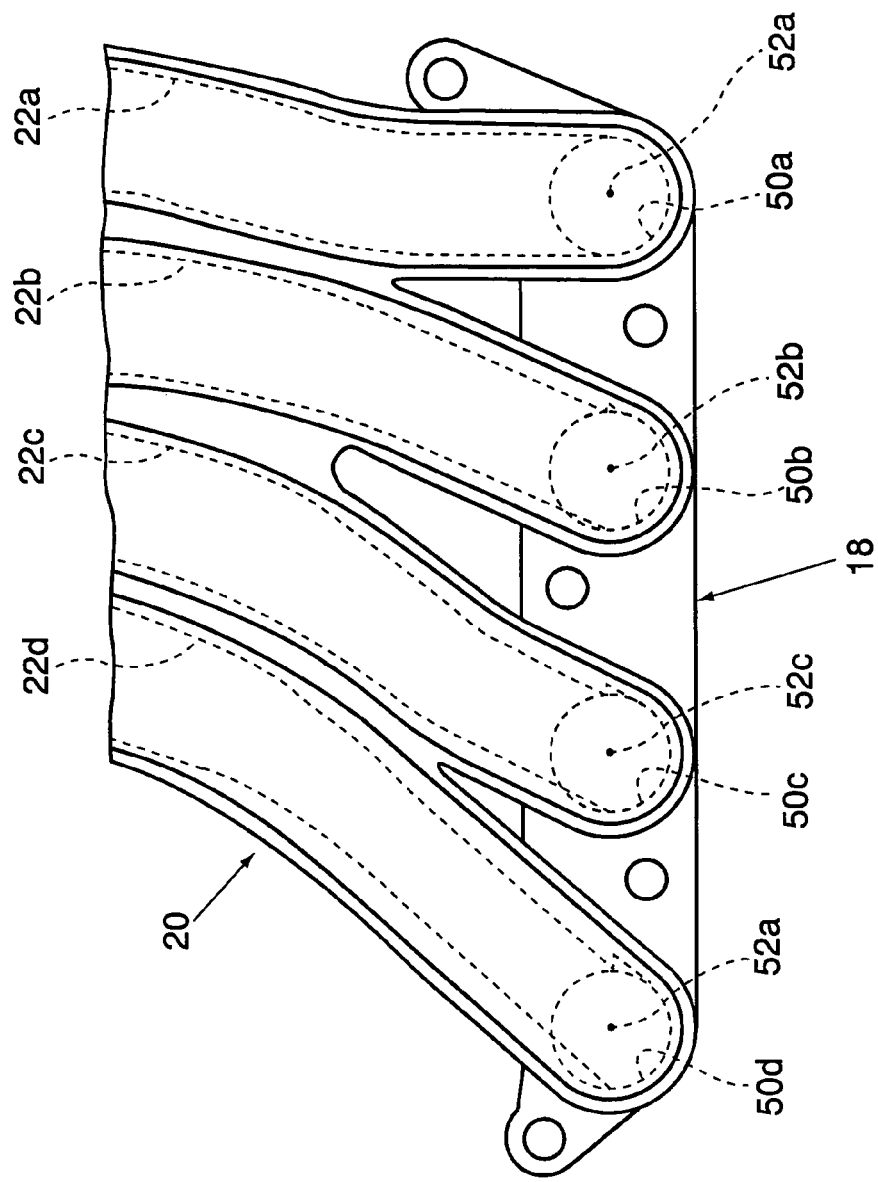
FIG. 19 is a plane view of the engine side of the intake manifold in FIG. 16.

FIG. 15 is a sectional view at line F-F, a line parallel to line A-A, of the state shown in FIG. 10 that the connecting face of the first member 102 and the connecting face of the second member 104 are vibration-welded. In FIG. 15, the connecting face 110-1, 110-2 of the first arm 106 of the first member 102 and the connecting face 114-1, 114-2 of the second arm 108 of the second member 104 position on the same plane H. In FIG. 15, the inner ridge line 132-1, 132-2 of the connecting face 110-1, 110-2 of the first arm 106 and the inner ridge line 136-1, 136-2 of the connecting face 114-1, 114-2 of the second arm 108 do not project to the passage 118. Therefore, no thick portion is formed.

As mentioned above and shown in FIG. 13 and FIG. 15, the sectional shape of the passage 118 can be formed circular which is ideal as shown in FIG. 13 by fixing the first member 102 having the first arm 106 without a thick portion and the second member 104 having the second arm 108 without a thick portion.

In the abovementioned explanation, as shown in FIG. 12, the edge of the rising boundary line 124-1, 124-2 at the passage 118 side is located at the intersecting point 130-1, 130-2 which is a contact point of a tangent line of the ridge line 132-1, 132-2 of the mount connecting face 110-1, 110-2 with the inner edge 128 of the top end connecting face 122 at the bore 120 side. However, the edge of the rising boundary line 124-1, 124-2 at the passage 118 side can also be located in the vicinity of the ideal point which is the intersecting point 130-1, 130-2, but not exactly at the ideal point. Even in the case that the edge of the rising boundary line 124-1, 124-2 at the passage 118 side is located in the vicinity of the intersecting point 130-1, 130-2, the section of the passage 118 is nearly circular, and the difference of the fluid flow amount is relatively small compared with the ideal sectional shape.

The vicinity of the ideal point means, in FIG. 12, the range that the angle θ from the orthogonal direction line Se passing through the intersecting line 130-1, 130-2 having its center at the axis center 126 of the bore 120 is equal to or less than 10 degrees each to the left and the right. Namely, the limit points are the points where the two lines Te being 10 degrees each to the left and the right from the orthogonal line Se having its center at the axis center 126 intersect to the inner edge 128 at the bore 120 side in FIG. 12.

In FIG. 12, it is explained that the section of the passage 118 is circular. However, the present invention can also be adapted to a passage which sectional shape is an oval or another.

INDUSTRIAL APPLICABILITY

When the present invention is applied to an intake manifold, since section shapes of all passages of a synthetic resin weld body having a plurality of passages can be ideally formed, engine performance can be improved by introducing an equal amount of air into each cylinder of a multi-cylinder engine. Further, with a synthetic resin weld body having one passage, the passage section can be ideally formed and the fluid flow amount passing through the passage can be increased than before.

The invention claimed is:

1. A synthetic resin weld body, comprising:
a first member made of synthetic resin which forms a plurality of first passage parts including a plurality of bores; and
a second member made of synthetic resin which forms a plurality of second passage parts;
wherein said first member is configured to connect to said second member;
wherein each of said first passage parts includes a top end connecting face formed around a respective one of said bores and having a first end and a second end, first and second mount connecting faces rising from said first and second ends, respectively, of the top end connecting face, and first and second ridge lines disposed on each of said first passage parts adjacent said first and second mount connecting faces, respectively;
wherein, for each of said first passage parts, a first rising boundary line is defined between said first end of said top end connecting face and said first mount connecting face, and a second rising boundary line is defined between said second end of said top end connecting face and said second mount connecting face;
wherein all of said first and second rising boundary lines are substantially parallel to one another;
wherein a plurality of passages are formed by connecting said first passage parts and said second passage parts, respectively, when said first member and said second member are connected and vibration-welded, the vibrations in the vibration welding being applied in a direction substantially parallel to the rising boundary lines;
wherein at least one of the plurality of passages extends in an orthogonal direction that is substantially orthogonal to the direction in which the rising boundary lines extend and at least another of the plurality of passages extends in a direction different from the orthogonal direction in which the at least one of said plurality of passages extends; and
wherein each said rising boundary line is disposed at or within a predetermined distance of a contact point between the respective mount connecting face where the respective ridge line is tangential to a respective bore and the respective end of the top end connecting face at the inner edge of said top end connecting face at the respective bore.

2. The synthetic resin weld body according to claim 1, wherein the predetermined distance is determined by a distance between a first line and a second line at the inner edge of the respective bore, the first line extending in an orthogonal direction to the direction of a respective passageway and passing through the axis center of the respective bore and the second line extending through the axis center of the respective bore and extending such that the angle between the first line and the second line is equal to or less than 10 degrees to the left or the right of the first line.

3. A synthetic resin weld body, comprising:
a first member made of synthetic resin which forms a bore and a first passage part leading to said bore; and
a second member made of synthetic resin which forms a second passage part;
wherein said first member and said second member are configured to connect;
wherein the first passage part includes a top end connecting face formed around said bore and having first and second ends, first and second mount connecting faces rising from said first and second ends, respectively, of said top end connecting face, and first and second ridge lines disposed on said first passage part adjacent the first and second mount connecting faces, respectively;
wherein a first rising boundary line is defined between said first end of said top end connecting face and said first mount connecting face, and a second rising boundary line is defined between said second end of said top end connecting face and said second mount connecting face;
wherein said first rising boundary line is substantially parallel to said second rising boundary line;
wherein a passage is formed by connecting said first passage part and said second passage part, when said first member and said second member are connected and vibration-welded, the vibrations being applied in a direction substantially parallel to said first and second rising boundary lines; and wherein a direction of the passage near said bore differs from a direction that is orthogonal to said first and second rising boundary lines;

wherein said rising boundary line is disposed at or within a predetermined distance of a contact point between said mount connecting face where the ridge line is tangential to said bore and the inner edge of said top end connecting face at the bore.

4. The synthetic resin weld body according to claim 3, wherein the predetermined distance is determined by a distance between a first line and a second line at the inner edge of said bore, the first line extending in an orthogonal direction to the direction of the passageway and passing through the axis center of said bore and a second line extending through the axis bore and extending such that the angle between the first line and the second line is equal to or less than 10 degrees to the left or the right of the first line.

* * * * *